United States Patent [19]
Baker et al.

[11] Patent Number: 5,652,282
[45] Date of Patent: Jul. 29, 1997

[54] LIQUID INKS USING A GEL ORGANOSOL

[75] Inventors: James A. Baker, Hudson, Wis.; Jai Venkatesan; Wu-Shyong Li, both of Woodbury, Minn.; Gay L. Herman, Cottage Grove, Minn.

[73] Assignee: Minnesota Mining and Manufacturing Company, St. Paul, Minn.

[21] Appl. No.: 536,856

[22] Filed: Sep. 29, 1995

[51] Int. Cl.$^6$ ............... G03G 9/13; C08L 51/06; C08K 5/01
[52] U.S. Cl. ............ 523/201; 524/476; 523/160; 525/278; 525/309; 430/116
[58] Field of Search .................. 525/309, 278; 523/201, 160; 524/476

[56] References Cited

U.S. PATENT DOCUMENTS

| | | | |
|---|---|---|---|
| 2,764,602 | 9/1956 | Ahlbrecht | 260/404.5 |
| 3,640,751 | 2/1972 | Kasuya et al. | 117/37 LE |
| 3,668,127 | 6/1972 | Machida et al. | 252/62.1 |
| 3,753,760 | 8/1973 | Kosel | 117/37 LE |
| 3,755,177 | 8/1973 | Tamai | 252/62.1 |
| 3,900,412 | 8/1975 | Kosel | 252/62.1 |
| 3,991,226 | 11/1976 | Kosel | 427/17 |
| 4,306,009 | 12/1981 | Veillette et al. | 430/115 |
| 4,363,863 | 12/1982 | Veillette et al. | 430/115 |
| 4,374,918 | 2/1983 | Veillette et al. | 430/115 |
| 4,456,725 | 6/1984 | Liu et al. | 524/476 |
| 4,476,210 | 10/1984 | Croucher et al. | 430/114 |
| 4,533,695 | 8/1985 | Theodore et al. | 525/278 |
| 4,728,983 | 3/1988 | Zwadlo et al. | 355/4 |
| 4,740,444 | 4/1988 | Trout | 430/137 |
| 4,749,506 | 6/1988 | Kitahara et al. | 252/62.54 |
| 4,789,616 | 12/1988 | Croucher et al. | 430/137 |
| 4,816,370 | 3/1989 | Croucher et al. | 430/115 |
| 4,818,657 | 4/1989 | Kondo et al. | 430/114 |
| 4,820,605 | 4/1989 | El-Sayed | 430/115 |
| 4,925,766 | 5/1990 | Elmasry et al. | 430/115 |
| 4,946,753 | 8/1990 | Elmasry et al. | 430/45 |
| 4,978,598 | 12/1990 | Elmasry et al. | 430/137 |
| 4,988,602 | 1/1991 | Jongewaard et al. | 430/115 |
| 4,994,341 | 2/1991 | Adair et al. | 430/115 |
| 5,053,306 | 10/1991 | El-Sayed et al. | 430/137 |
| 5,061,583 | 10/1991 | Zwadlo et al. | 430/45 |
| 5,302,482 | 4/1994 | Elmasry et al. | 430/115 |
| 5,547,804 | 8/1996 | Nishizawa et al. | 430/114 |

FOREIGN PATENT DOCUMENTS

| | | |
|---|---|---|
| 19511476 | 11/1995 | Germany. |
| 55-104321 | 7/1980 | Japan. |
| 57-030848 | 2/1982 | Japan. |
| 59-49938 | 3/1984 | Japan. |
| 59-182800 | 9/1984 | Japan. |
| 60-194461 | 10/1985 | Japan. |
| 61-062045 | 3/1986 | Japan. |
| 2066493 | 8/1983 | United Kingdom. |

OTHER PUBLICATIONS

C. Ma and P. Materazzi, *"The Design of Polymeric Stabilizers for Electrostatically–Based Liquid Toners,"* Proceedings of SPSE's 42nd Annual Conference, May 14–19, 1989.

*Primary Examiner*—Andrew E. C. Merriam
*Attorney, Agent, or Firm*—Gary L. Griswold; Walter N. Kirn; Arlene K. Musser

[57] ABSTRACT

An organosol comprising a high molecular weight (co) polymeric steric stabilizer covalently bonded to an insoluble, high molecular weight thermoplastic (co) polymeric core is described which has the ability to form a three dimensional gel of controlled rigidity. The gel provides improved liquid ink or liquid electrophotographic/electrographic toner compositions by increasing sedimentation stability of the colorant, without compromising print quality or ink transfer performance. The gel is formed by manipulating the solubility parameter difference between the stabilizer and the solvent to achieve optimum performance of the dispersion.

19 Claims, No Drawings

LIQUID INKS USING A GEL ORGANOSOL

FIELD OF THE INVENTION

This invention relates to liquid ink compositions, in particular, to pigments dispersed in gel organosols to provide improved ink compositions and liquid toners for use in ink transfer, ionographic, electrographic and electrophotographic printing processes.

BACKGROUND

Liquid inks are widely used in a variety of printing processes, for example offset, intaglio, rotogravure, ink jet and electrophotographic printing. Many of the desired characteristics of the pigment dispersions used in the liquid inks are the same for each of the respective processes even though the final ink formulations may be substantially different. For example, the stability of the pigment dispersion both on the shelf and under shear conditions is an important consideration regardless of the final use of the liquid ink. The art continuously searches for more stable pigment dispersions to provide more flexibility in ink formulations which in turn yields better efficiency and waste reduction in the various printing processes.

In electrophotographic applications, which includes devices such as photocopiers, laser printers, facsimile machines and the like, liquid inks are referred to as liquid toners or developers. Generally, the electrophotographic process includes the steps of forming a latent electrostatic image on a charged photoconductor by exposing the photoconductor to radiation in an imagewise pattern, developing the image by contacting the photoconductor with a liquid developer, and finally transferring the image to a receptor. The final transfer step may be performed either directly or indirectly through an intermediate transport member. The developed image is usually subjected to heat and/or pressure to permanently fuse the image to the receptor.

In the field of electrographic printing, particularly electrophotographic printing, a variety of both liquid and dry developing compositions have been employed to develop the latent electrostatic images. Dry toner compositions suffer from a number of disadvantages. For example, dry toners are known to be difficult to control during the latent image development and transfer processes; this leads to toner scatter within the printer device and may create excessive amounts of dust and abrasive wear of the printer components. Some dry toner compositions must also be fixed by fusing at elevated temperature, which requires a large source of energy and may limit the choices of receptor materials to which the developed latent image may be transferred. Moreover, dry toners must be triboelectrically charged, which makes the printing process very sensitive to both the temperature and humidity of the ambient air and may result in printing delays due to charge equilibration. The limited particle size of the toner is another disadvantage of dry toners. If the particle size is small, the dry toner can become airborne and create a potential health hazard due to inhalation of the particles. On the other hand, the larger particle sizes make it difficult to obtain high resolution images.

Many of the disadvantages accompanying the use of dry toner compositions have been avoided by the use of liquid developers or toners. For example, liquid toners contain smaller particles than dry toners resulting in higher resolution images. In addition, liquid toners are not triboelectrically charged; therefore, they are much less sensitive to changes in ambient temperature and humidity. Since the toner particles in a liquid developer are contained within a fluid phase, toner scatter and dust accumulation do not occur within the printer. In addition, the particles being contained within a liquid matrix will not become airborne thus eliminating the risk of inhalation of the particles.

Liquid toners typically comprise an electrically insulating liquid which serves as a carrier for a dispersion of charged particles known as toner particles composed of a colorant and a polymeric binder. A charge control agent is often included as a component of the liquid developer in order to regulate the polarity and magnitude of the charge on the toner particles. Liquid toners can be categorized into two primary classes, for convenience, the two classes will be referred to as conventional liquid toners and organosol toners.

Of particular utility are the class of liquid toners which make use of self-stable organosols as polymeric binders to promote self-fixing of a developed latent image. U.S. Pat. Nos. 3,753,760; 3,900,412; 3,991,226; 4,476,210; 4,789,616; 4,728,983; 4,925,766; 4,946,753; 4,978,598 and 4,988,602 describe the composition and use of these types of organosols. Self-stable organosols are colloidal (0.1–1 micron diameter) particles of polymeric binder which are typically synthesized by nonaqueous dispersion polymerization in a low dielectric hydrocarbon solvent. These organosol particles are sterically-stabilized with respect to aggregation by the use of a physically-adsorbed or chemically-grafted soluble polymer. Details of the mechanism of such steric stabilization are provided in Napper, D. H., *Polymeric Stabilization of Colloidal Dispersions*, Academic Press, New York, N.Y., 1983. Procedures for effecting the synthesis of self-stable organosols are known to those skilled in the art and are described in *Dispersion Polymerization in Organic Media*, K. E. J. Barrett, ed., John Wiley: New York, N.Y., 1975. Although it is generally recognized that the solvation of the particle is critical in the formation of a dispersion, none of the foregoing references recognize the utility of a gel in forming a stable dispersion.

The most commonly used non-aqueous dispersion polymerization method is a free radical polymerization carried out when one or more ethylenically-unsaturated (typically acrylic) monomers, soluble in a hydrocarbon medium, are polymerized in the presence of a preformed amphipathic polymer. The preformed amphipathic polymer, commonly referred to as the stabilizer, is comprised of two distinct repeat units, one essentially insoluble in the hydrocarbon medium, the other freely soluble. When the polymerization proceeds to a fractional conversion of monomer corresponding to a critical molecular weight, the solubility limit is exceeded and the polymer precipitates from solution, forming a core particle. The amphipathic polymer then either adsorbs onto or covalently bonds to the core, which core continues to grow as a discrete particle. The particles continue to grow until monomer is depleted; the attached amphipathic polymer "shell" acts to sterically-stabilize the growing core particles with respect to aggregation. The resulting core/shell polymer particles comprise a self-stable, nonaqueous colloidal dispersion (organosol) comprised of distinct spherical particles in the size (diameter) range 0.1–0.5 microns.

The resulting organosols can be subsequently converted to liquid toners by simple incorporation of the colorant (pigment) and charge director, followed by high shear homogenization, ball-milling, attritor milling, high energy bead (sand) milling or other means known in the art for effecting particle size reduction in a dispersion. The input of mechanical energy to the dispersion during milling acts to break down aggregated pigment particles into primary particles (0.05–1.0 micron diameter) and to "shred" the organosol into fragments which adhere to the newly-created pigment surface, thereby acting to sterically-stabilize the pigment particles with respect to aggregation. The charge director may physically or chemically adsorb onto the pigment, the organosol or both. The result is a sterically-stabilized, charged, nonaqueous pigment dispersion in the size range 0.1–2.0 microns, with typical toner particle diameters between 0.1–0.5 microns. Such a sterically-stabilized dispersion is ideally suited for use in high resolution printing.

Rapid self-fixing is a critical requirement for liquid toner performance to avoid printing defects (such a smearing or trailing-edge tailing) and incomplete transfer in high speed printing. A description of these types of defects and methods of preventing them using film forming compositions are described in U.S. Pat. Nos. 5,302,482; 5,061,583; and 4,925, 766.

Another important consideration in formulating a liquid toner is the tack of the image on the final receptor. If the image has a residual tack, then the image may become embossed or picked off when placed in contact with another surface. This is especially a problem when printed sheets are placed in a stack. If the image is tacky, it may transfer to the backside of the adjacent sheet. To address this concern, a film laminate or protective layer is typically placed over the surface of the image. This adds both extra cost of materials and extra process steps to apply the protective layer.

It is further known in the art that film-forming liquid toners fabricated using self-stable organosols generally exhibit excellent aggregation stability; however, the sedimentation stability of such inks is poor. Once the components of an organosol ink have settled, they are generally difficult if not impossible to redisperse to a degree of dispersion equivalent to the original, unsettled ink. This situation arises because self-stable organosol inks settle into closely packed, dilatant sediments, and irreversible film formation can occur in these sediments when the volume fraction of organosol in the sediment exceeds the critical volume fraction required for film formation to occur (generally greater than 70 volume percent organosol). Hence, there is a need for liquid ink compositions which will overcome this poor sedimentation and redispersion behavior of organosol inks.

Attempts have been made to provide liquid developers having improved storage and thermal stability using a two component gel/latex system. U.S. Pat. Nos. 4,374,918; 4,363,863; 4,306,009; GB 2,066,493; and GB 2,065,320 describe liquid developers incorporating polymers having borderline solubility in the carrier solvent. A stabilizing gel and latex (or gelatex) are used as a dispersant and/or fixative. The gel and latex are separate non-covalently bonded materials in the ink formulation. Separate materials may adversely affect the aggregation stability which can lead to preferential depletion of one of the two components during extended printing thus adversely affecting print quality. Separate components can also result in a broad molecular weight distribution for stabilizing the gel, which may have an adverse affect on the toner charge characteristics. In addition, the separate materials may lead to a high free phase conductivity.

Attempts have also been made to overcome the poor sedimentation stability of pigmented liquid toners by replacing the pigment with a dye of significantly lower density. U.S. Pat. No. 4,816,370 describes a liquid developer using a thermally reversible, flocculated, dyed organosol. The colorant used is a dye rather than a pigment. It is well established in the art that dyes are less stable to light and have a tendency to migrate or sublime. Even though dyes have inherent advantages, such as transparency of the colors and less interference with the characteristics of the thermoplastic binders, their poor light stability often times overrides these advantages.

Currently, no one has sufficiently addressed the problem of sedimentation in pigmented liquid inks, in particular liquid toners.

SUMMARY OF THE INVENTION

The present invention provides a stable redispersible gel organosol dispersion comprising a carrier liquid and a (co) polymeric steric stabilizer having a molecular weight greater than or equal to 50,000 Daltons and a polydispersity less than 15 covalently bonded to a thermoplastic (co)polymeric core that is insoluble in the carrier liquid. The gel organosol is characterized by having a weight ratio of the steric stabilizer to the thermoplastic core between $1/1$ and $1/15$. The steric stabilizer comprises polymerizable organic compounds or mixture of polymerizable organic compounds having an absolute Hildebrand solubility parameter difference between the polymerizable organic compounds or mixture of polymerizable organic compounds and the carrier liquid between 2.3 and 3.0 $MPa^{1/2}$. A redispersible liquid color ink can be made by adding a colorant or mixture of colorants to the gel organosol dispersion. In some applications, it may be advantageous for the thermoplastic core to have a glass transition temperature between 25° C. and −10° C.

In one embodiment of the invention, an electrophotographic or electrographic liquid color toner is provided comprising a carrier liquid having a Kauri-butanol number less than 30; at least one colorant; a charge director; and a gel organosol comprising a (co)polymeric steric stabilizer having a molecular weight between 50,000 and 750,000 Daltons and a polydispersity less than 15 covalently bonded to a thermoplastic (co)polymeric core that is insoluble in the carrier liquid and has a glass transition temperature between 25° C. and −10° C. The gel organosol can be further characterized by having a weight ratio of the steric stabilizer to the thermoplastic core between $1/1$ and $1/15$. The steric stabilizer comprises polymerizable organic compounds or mixture of polymerizable organic compounds having an absolute Hildebrand solubility parameter difference between the polymerizable organic compounds or mixture of polymerizable organic compounds and the carrier liquid between 2.3 and 3.0 $MPa^{1/2}$, more preferably between 2.5 and 3.0 $MPa^{1/2}$, and most preferably between 2.6 and 3.0 $MPa^{1/2}$.

In another embodiment of the invention, a process is provided using the electrophotographic liquid color toner described above to form an image on a receptor. The process comprises the steps of: (a) providing a photoreceptive element having an electrostatic charge on the surface thereof, (b) exposing the surface with a radiation source to discharge portions of the surface to produce a latent image; (c) applying the electrophotographic liquid color toner described above to the latent image on the surface of the photoreceptive element to form a toned image; (d) optionally transferring the toned image onto a transfer medium; and transferring the toned image to a final receptor. The final receptor includes coated or uncoated films and coated or uncoated paper.

In yet another embodiment of the invention, a process is provided using the electrographic liquid color toner described above to form an image on a receptor. The process comprises the steps of: (a) providing a dielectric element; (b) applying an electrostatic charge in an imagewise pattern on a surface of the dielectric element to produce a latent image; (c) applying the electrographic liquid color toner described earlier to the latent image on the surface of the dielectric element to form a toned image, and optionally transferring the toned image to a receptor. The dielectric element may be the final receptor or the image may be transferred to receptor different from the dielectric element.

In yet another embodiment of the invention, a process is provided for making a high solids liquid color ink. The process comprises the steps of: (a) forming a dispersion of a gel organosol (described earlier) in a carrier liquid; (b) adding at least one colorant to the dispersion; (c) allowing a portion of the carder liquid to phase separate from the dispersion; and (d) removing the portion of the carrier liquid from the dispersion to form a concentrated colored dispersion. A charge director may also be added with the colorant(s) to form a concentrated electrophotographic or electrographic liquid color toner.

An alternative process for forming a high solids liquid color ink is also provided using the process steps of: (a) forming a dispersion of a gel organosol (described earlier) in a carrier liquid; (b) allowing a portion of the carrier liquid to phase separate from the dispersion; (c) removing the portion of the carrier liquid from the dispersion to form a concentrated dispersion; and (d) adding at least one colorant to the concentrated dispersion to form a colored concentrate. A charge director may also be added with the colorant(s) to form a concentrated electrophotographic or electrographic liquid color toner.

The gel organosols of the present invention are particularly useful for their ability to form a three dimensional gel of controlled rigidity which can be reversibly reduced to a fluid state by shearing or heating the organosol or an ink composition containing the organosol. The gels impart useful properties to the liquid ink, notably improved sedimentation stability of the colorant, without compromising print quality or ink transfer performance. The inks formulated with the gels also exhibit improved redispersion characteristics upon settling, and do not form dilatant sediments such as those formed by non-gelled organosol inks. These characteristics of gel inks facilitate preparation and use of high solids ink concentrates (greater than 2% by weight solids, more preferably greater than 10% by weight solids), thus providing an increased number of printed pages or images from a given volume of ink.

The liquid inks of the present invention will be described with respect to electrophotographic office printing; however, it is to be understood that these liquid toners are not limited in their utility and may also be employed in high speed printing presses, photocopying apparatus, microfilm reproduction devices, facsimile printing, ink jet printer, instrument recording devices, and the like.

DETAILED DESCRIPTION OF THE INVENTION

A liquid ink composition is provided comprising a colorant and a gel organosol dispersed in a liquid or liquid blend having a Kauri-Butanol (KB) number less than 30. The liquid ink composition is resistant to sedimentation and is capable of rapidly self-fixing, which is particularly useful in electrophotographic, ionographic or electrostatic imaging and conventional printing processes.

As used herein, the terms:

"Kauri-Butanol" refers to an ASTM Test Method D1133-54T. The Kauri-Butanol Number (KB) is a measure of the tolerance of a standard solution of kauri resin in 1-butanol to an added hydrocarbon diluent and is measured as the volume in milliliters (mL) at 25° C. of the solvent required to produce a certain defined degree of turbidity when added to 20 g of a standard kauri-1-butanol solution. Standard values are toluene (KB=105) and 75% by volume of heptane with 25% by volume toluene (KB=40). There is an approximately linear relationship between the Hildebrand solubility parameter and the KB number for hydrocarbons: Hildebrand Solubility Parameter $(MPa^{1/2})=2.0455[6.3+0.03KB \text{ (mL)}]$.

"Gel" refers to a mixture of an organic solvent and a polymer network wherein the polymer network is formed through physical aggregation of the polymer chains through hydrogen bonds or other non-chemical bonds of comparable strength. Gels are dispersions in which the attractive interactions between the elements of the dispersed phase are so strong that the whole system develops a rigid network structure and, under small stresses, behaves elastically.

"Hildebrand solubility parameter" refers to a solubility parameter represented by the square root of the cohesive energy density of a material, having units of $(pressure)^{1/2}$, and being equal to $(\Delta H - RT)^{1/2}/V^{1/2}$, where $\Delta H$ is the molar vaporization enthalpy of the material, R is the universal gas constant, T is the absolute temperature, and V is the molar volume of the solvent. Hildebrand solubility parameters are tabulated for solvents in: Barton, A. F. M., *Handbook of Solubility and Other Cohesion Parameters*, 2nd Ed. CRC Press, Boca Raton, Fla., (1991), for monomers and representative polymers in *Polymer Handbook*, 3rd Ed., J. Brandrup & E. H. Immergut, Eds. John Wiley, N.Y., pp 519–557 (1989), and for many commercially available polymers in Barton, A. F. M., *Handbook of Polymer-Liquid Interaction Parameters and Solubility Parameters*, CRC Press, Boca Raton, Fla., (1990).

"(Co)polymer" or "(co)polymeric" refers to homopolymers as well as polymers based on the polymerization of two or more monomeric compounds.

The polymeric gel of the present invention is an amphipathic copolymeric gel (also known as an organosol) comprised of a soluble or marginally insoluble high molecular weight (co)polymeric steric stabilizer covalently bonded to an insoluble, thermoplastic (co)polymeric core. The covalently bonded (or grafted) steric stabilizer is manipulated such that the (co)polymer is near the incipient phase separation point in the dispersant. The resulting graft stabilizer remains in a freely flowing, easily handled solution until the graft stabilizer is covalently bonded to the insoluble core, at which point a gel organosol is formed. In addition, superior stability of the dispersed toner particles with respect to aggregation is obtained when at least one of the polymers or copolymers (denoted as the stabilizer) is an amphipathic substance containing at least one oligomeric or polymeric component of molecular weight at least 500 which is solvated by the carrier liquid. In other words, the selected stabilizer, if present as an independent molecule, would have some finite solubility in the carrier liquid.

The solubility of a material in a given solvent may be predicted from the absolute difference in Hildebrand solubility parameter of the solute relative to the solvent. The solutes will exist as true solutions or in a highly solvated state when the absolute difference in Hildebrand solubility parameter is less than approximately 1.5 $MPa^{1/2}$. When the absolute difference in Hildebrand solubility parameter exceeds approximately 3.0 MPa$^{1/2}$, the solute will phase separate from the dispersant, forming a solid, insoluble, non-flowing, non-geller mass. Those solutes having an absolute difference in Hildebrand solubility parameters between 1.5 MPa$^{1/2}$ and 3.0 MPa$^{1/2}$ are considered to be weakly solvated or marginally insoluble.

In the present invention, it has been found that the absolute difference of the Hildebrand solubility parameter of the graft stabilizer relative to the solvent can be manipulated to yield self-stable organosols which have the additional advantage of rapidly forming a physically or thermally reversible gel suitable for preventing or retarding pigment sedimentation when used in liquid ink compositions.

The strength of the gel (and hence sedimentation resistance of the ink) can be manipulated by controlling the extent to which the graft stabilizer's Hildebrand solubility parameter differs from that of the dispersant. Greater gel strength (greater sedimentation resistance) is obtained by increasing the absolute difference in Hildebrand solubility parameter between the graft stabilizer and the dispersant. Gel strength can be manipulated by selecting polymerizable organic compounds or mixtures of polymerizable organic compounds for use in the graft stabilizer which have solubility parameters marginally less than, equal to, or marginally greater than that of the dispersant, but which yield an absolute difference in Hildebrand solubility parameter of between 2.5 and 3.0 MPa$^{1/2}$, more preferably between 2.6 and 3.0 MPa$^{1/2}$ in a hydrocarbon solvent. These selected polymerizable organic compounds or mixture of polymerizable organic compounds are present in amounts of at least 80% by weight of the graft stabilizer polymer, more preferably at least 90% by weight, and most preferably at least 92% by weight. The strength of the gel is directly related to the magnitude of the absolute difference in Hildebrand solubility parameter between the graft stabilizer and the dispersant. However, the range of absolute differences may vary depending upon the polarity of the solvent. A slight increase in polarity of the solvent can lower the absolute difference in Hildebrand solubility parameters. By the addition of a small amount of a more polar solvent to a hydrocarbon solvent, the lower threshold for gel formation may be lowered to approximately 2.3 MPa$^{1/2}$ as evidenced by Example 36 in Table III of the Examples section.

Alternatively, the effective Hildebrand solubility parameter of the dispersant liquid may be adjusted, for example, by selecting a dispersant having the appropriate Hildebrand solubility parameter or by blending solvents in the proper proportions so as to obtain an absolute difference in Hildebrand solubility parameter between the graft stabilizer and the dispersant liquid which falls within the range of 2.6 to 3.0 MPa$^{1/2}$.

Those skilled in the art understand that the Hildebrand solubility parameter for a copolymer may be calculated using a volume fraction weighting of the individual Hildebrand solubility parameters for each monomer comprising the copolymer, as described for binary copolymers in Barton A. F. M., *Handbook of Solubility Parameters and Other Cohesion Parameters*, CRC Press, Boca Raton, p 12 (1990). The magnitude of the Hildebrand solubility parameter for polymeric materials is also known to be weakly dependent upon the molecular weight of the polymer, as noted in Barton, pp 446–448. Thus, there will be a preferred molecular weight range for a given polymer, and gel strength may be additionally controlled by manipulating the molecular weight of the graft stabilizer (higher molecular weight yields stronger gels). Such methods of controlling the molecular weight of a graft stabilizer are known to those skilled in the art, and include, but are not limited to, variation of initiator concentration, temperature and total reactant concentration.

According to Barton, the Hildebrand solubility parameter for polymeric materials is also weakly dependent upon the temperature of the dispersant liquid. Thus, gel strength may also be controlled by controlling the temperature at which the liquid ink is used.

In view of the dependence of the Hildebrand solubility parameter for polymers on both the molecular weight of the polymer and the temperature, we have found it most convenient to define our invention in terms of the values of Hildebrand solubility parameter for the polymerizable organic compounds which comprise the graft stabilizer precursor. Such polymerizable organic compounds include, but are not limited to monomers, oligomers, macromers and the like. It will thus be understood by those skilled in the art that the Hildebrand solubility parameter for a copolymer may be calculated using a volume fraction weighting of the individual Hildebrand solubility parameters for each monomer comprising the copolymer, as described for binary copolymers in Barton, A. F. M., *Handbook of Polymer-Liquid Interaction Parameters and Solubility Parameters*, CRC Press, Boca Raton, Fla., p 12 (1990).

Similarly, the Hildebrand solubility parameter for a mixture may be calculated using a volume fraction weighting of the individual Hildebrand solubility parameters for each component of the mixture. Thus, the Hildebrand solubility parameter for a mixture of solvents or polymerizable organic compounds may be calculated using a volume fraction weighting of the individual Hildebrand solubility parameters for each chemical compound comprising the solvent mixture.

In addition, we have defined our invention in terms of the calculated solubility parameters of the monomers and solvents obtained using the group contribution method developed by Small, P. A., *J. Appl. Chem.*, 3, 71 (1953) using Small's group contribution values listed in Table 2.2 on page VII/525 in the *Polymer Handbook*, 3rd Ed., J. Brandrup & E. H. Immergut, Eds. John Wiley, N.Y., (1989). We have chosen this method for defining our invention to avoid ambiguities which could result from using solubility parameter values obtained with different experimental methods. In addition, Small's group contribution values will generate solubility parameters which are consistent with data derived from measurements of the enthalpy of vaporization, and therefore are completely consistent with the defining expression for the Hildebrand solubility parameter. Since it is not practical to measure the heat of vaporization for polymers, monomers are a reasonable substitution.

Table I lists some the Hildebrand solubility parameters for some common solvents used in an electrophotographic toner and the Hildebrand solubility parameters and glass transition temperatures for some common monomers used in synthesizing organosols.

TABLE I

| Hildebrand Solubility Parameters | | |
|---|---|---|
| Solvent Values at 25° C. | | |
| Solvent Name | Kauri-Butanol Number by ASTM Method D1133-54T (mL) | Hildebrand Solubility Parameter (MPa$^{1/2}$) |
| Norpar ™ 15 | 18 | 13.99 |
| Norpar ™ 13 | 22 | 14.24 |
| Norpar ™ 12 | 23 | 14.30 |
| Isopar ™ V | 25 | 14.42 |
| Exxsol ™ D80 | 28 | 14.60 |

Source: Calculated from equation #31 of Polymer Handbook, 3rd Ed., J. Brandrup E. H. Immergut, Eds. John Wiley, NY, p. VII/522 (1989).

TABLE I-continued

Hildebrand Solubility Parameters

Monomer Values at 25° C.

| Monomer Name | Hildebrand Solubility Parameter (MPa$^{1/2}$) | Glass Transition Temperature (°C.)* |
| --- | --- | --- |
| n-Octadecyl Methacrylate | 16.77 | −100 |
| n-Octadecyl Acrylate | 16.82 | −55 |
| Lauryl Methacrylate | 16.84 | −65 |
| Lauryl Acrylate | 16.95 | −30 |
| 2-Ethylhexyl Methacrylate | 16.97 | −10 |
| 2-Ethylhexyl Acrylate | 17.03 | −55 |
| n-Hexyl Methacrylate | 17.13 | −5 |
| t-Butyl Methacrylate | 17.16 | 107 |
| n-Butyl Methacrylate | 17.22 | 20 |
| n-Hexyl Acrylate | 17.30 | −60 |
| n-Butyl Acrylate | 17.45 | −55 |
| Ethyl Acrylate | 18.04 | −24 |
| Methyl Methacrylate | 18.17 | 105 |

Calculated using Small's Group Contribution Method, Small, P. A. Journal of Applied Chemistry 3 p. 71 (1953). Using Group Contributions from Polymer Handbook, 3rd Ed., J. Brandrup E. H. Immergut, Eds., John Wiley, NY, p. VII/525 (1989).
*Polymer Handbook, 3rd Ed., J. Brandrup E. H. Immergut, Eds., John Wiley, NY, pp. VII/209–277 (1989). The $T_g$ is of the homopolymer of the respective monomer.

The carrier liquid or solvent may be selected from a wide variety of materials which are known in the art, but should have a Kauri-butanol number less than 30 mL. The liquid is typically oleophilic, chemically stable under a variety of conditions, and electrically insulating. Electrically insulating refers to a dispersant liquid having a low dielectric constant and a high electrical resistivity. Preferably, the dispersant has a dielectric constant of less than 5; more preferably less than 3. Electrical resistivities of carrier liquids are typically greater than 10$^9$ Ohm-cm; more preferably greater than 10$^{10}$ Ohm-cm. The dispersant must also be relatively nonviscous to allow movement of the charged particles during development. The liquid must be sufficiently volatile to permit its removal from the final imaged substrate, but sufficiently non-volatile to minimize evaporative losses in the developer. In addition, the dispersant must be chemically inert with respect to the materials or equipment used in the liquid electrophotographic process, particularly the photoreceptor and its release surface. Finally, the carrier liquid must be safe in terms of its physical (flammability), chemical, toxicological and environmental characteristics.

Examples of suitable dispersants include aliphatic hydrocarbons (n-pentane, hexane, heptane and the like), cycloaliphatic hydrocarbons (cyclopentane, cyclohexane and the like), aromatic hydrocarbons (benzene, toluene, xylene and the like), halogenated hydrocarbon solvents (chlorinated alkanes, fluorinated alkanes, chlorofluorocarbons and the like), silicone oils and blends of these solvents. Preferred carrier liquids include branched paraffinic solvent blends such as Isopar™ G, Isopar™ H, Isopar™ K, Isopar™ L, Isopar™ M and Isopar™ V (available from Exxon Corporation, N.J.), and most preferred carriers are the aliphatic hydrocarbon solvent blends such as Norpar™ 12, Norpar™ 13 and Norpar™ 15 (available from Exxon Corporation, N.J.).

The graft stabilizer may be chemically bonded to the resin core (i.e., grafted to the core) or may be adsorbed onto the core such that it remains as an integral part of the resin core. Any number of reactions known to those skilled in the art may be used to effect grafting of the soluble polymeric stabilizer to the organosol core during free radical polymerization. Common grafting methods include random grafting of polyfunctional free radicals; ting-opening polymerizations of cyclic ethers, esters, amides or acetals; epoxidations; reactions of hydroxyl or amino chain transfer agents with terminally-unsaturated end groups; esterification reactions (i.e., glycidyl methacrylate undergoes tertiary-amine catalyzed esterification with methacrylic acid); and condensation polymerization.

Examples of suitable polymerizable organic compounds for use in the graft stabilizer composition non-exclusively include monomers such as, 2-ethylhexyl acrylate, lauryl acrylate, octadecyl acrylate, 2-ethylhexyl(methacrylate), lauryl methacrylate, hydroxy(ethylmethacrylate), octadecyl (methacrylate) and other acrylates and methacrylates which meet the solubility parameter requirements described above. Other monomers, macromers or polymers may be used either alone or in conjunction with the aforementioned materials, including melamine and melamine formaldehyde resins, phenol formaldehyde resins, epoxy resins, polyester resins, styrene and styrene/acrylic copolymers, acrylic and methacrylic esters, cellulose acetate and cellulose acetate-butyrate copolymers, and poly(vinyl butyral) copolymers. Preferred molecular weights of the graft stabilizer are $\geq 50{,}000$ Daltons (Da), more preferably $\geq 150{,}000$ Da, most preferably $\geq 200{,}000$ Da.

The polydispersity of the graft stabilizer also has an affect on imaging and transfer performance of the liquid toners. Generally, it is desirable to maintain the polydispersity (the ratio of the weight-average molecular weight to the number average molecular weight) of the graft stabilizer below 15, more preferably below 5, most preferably below 2.5.

An additional feature of the present invention is the novel grafting site used to covalently bond the stabilizer to the insoluble core. The grafting site is formed by incorporating hydroxyl groups into the graft stabilizer during a first free radical polymerization and catalytically reacting all or a portion of these hydroxyl groups with an ethylenically unsaturated aliphatic isocyanate (e.g. meta-isopropenyldimethylbenzyl isocyanate [TMI] or 2-cyanatoethylmethacrylate [IEM]) to form a polyurethane linkage during a subsequent non-free radical reaction step. The graft stabilizer is then covalently bonded to the nascent insoluble acrylic (co)polymer core via reaction of the unsaturated vinyl group of the grafting site with ethylenically-unsaturated core monomers (e.g. vinyl esters, particularly acrylic and methacrylic esters with carbon numbers <7 or vinyl acetate; vinyl aromatics, such as styrene; acrylonitrile; n-vinyl pyrrolidone; vinyl chloride and vinylidene chloride) during a subsequent free radical polymerization step.

Other methods of effecting grafting of the preformed polymeric stabilizer to the incipient insoluble core particle are known to those skilled in the art. While not wishing to restrict ourselves to any particular grafting mechanism, non-limiting examples of alternative grafting mechanisms are exemplified in sections 3.7–3.8 of Barrett *Dispersion Polymerization in Organic Media*, K. E. J. Barrett, ed., (John Wiley: New York, 1975), pp. 79–106. A particularly useful method for grafting the polymeric stabilizer to the core utilizes an anchoring group. The function of the anchoring group is to provide a covalent link between the core part of the particle and the soluble component of the steric stabilizer. Suitable monomers containing anchoring groups include: adducts of alkenylazlactone comonomers with an unsaturated nucleophile containing hydroxy, amino, or mercaptan groups, such as 2-hydroxyethylmethacrylate, 3-hydroxypropylmethacrylate, 2-hydroxyethylacrylate, pentaerythritol triacrylate, 4-hydroxybutylvinylether, 9-octadecen-1-ol, cinnamyl alcohol, allyl mercaptan, methallylamine; and azlactones, such as 2-alkenyl-4,4-dialkylazlactone of the structure

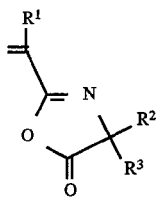

where, $R^1$=H, or alkyl having 1 to 5 carbons, preferably one carbon, $R^2$ and $R^3$ are independently lower alkyl groups having 1 to 8 carbons, preferably 1 to 4 carbons. Preferably the grafting mechanism is accomplished by grafting an ethylenically-unsaturated isocyanate (i.e., dimethyl-m-isopropenyl benzylisocyanate, available from American Cyanamid) to hydroxyl groups previously incorporated into the graft stabilizer precursor (i.e., hydroxy ethyl methacrylate).

The insoluble core is the dispersed phase of the polymer dispersion. The core polymer is made in situ by copolymerization with the stabilizer monomer. The composition of the insoluble resin core is preferentially manipulated such that the organosol exhibits an effective glass transition temperature ($T_g$) of less than 25° C., more preferably less than 6° C. Controlling the glass transition temperature allows one to formulate an ink composition containing the resin as a major component to undergo rapid film formation (rapid self-fixing) in printing or imaging processes carded out at temperatures greater than the core $T_g$, preferably at or above 23° C. Rapid self-fixing assists in avoiding printing defects (such as smearing or trailing-edge tailing) and incomplete transfer in high speed printing. The use of low $T_g$ thermoplastic polymeric binders to promote film formation is described in Z. W. Wicks, Film Formation, Federation of Societies for Coatings Technologies, p 8 (1986).

The $T_g$ can be calculated for a (co)polymer using known values for the high molecular weight homopolymers (Table I) and the Fox equation expressed below:

$$1/T_g = w_1/T_{g1} + w_2/T_{g2} + w_3/T_{g3} + \ldots$$

where $w_i$ is the weight fraction of monomer "i" and $T_{gi}$ is the glass transition temperature of the high molecular weight homopolymer of monomer "i" as described in Wicks, A. W., F. N. Jones & S. P. Pappas, Organic Coatings, 1, John Wiley, N.Y., pp 54–55 (1992).

Another reason for using a latex polymer having a $T_g$<25° C. is that such a latex can coalesce into a resinous film at room temperature. According to this invention, it has been found that the overprinting capability of a toner is related to the ability of the latex polymer particles to deform and coalesce into a resinous film during the air drying cycle of the electrophoretically deposited toner particles. The coalescent particles permit the electrostatic latent image to discharge during the imaging cycle, so another image can be overprinted. On the other hand, non-coalescent particles of the prior art retain their shape even after being air dried on the photoreceptor. The points of contact are then few compared to a homogeneous or continuous film-forming latex, and as a result, some of the charges are retained on the unfused particles, repelling the next toner. Furthermore, a toner layer made of a latex having a core with a $T_g$>25° C. may be made to coalesce into a film at room temperature if the stabilizer/core ratio is high enough. Thus the choice of stabilizer/(core+stabilizer) ratios in the range 20 wt. % to 80 wt. % can give coalescence at room temperature with core $T_g$ values in a corresponding range 25° C. to 105° C. With a core $T_g$<25° C. the preferred range of stabilizer/(core+stabilizer) ratio is 10 to 40 wt. %.

In addition, organosols having $T_g$ cores <–30° C. do not transfer well due to their high tack; whereas organosols with core $T_g$'s above room temperature (25° C.) do not form cohesive films resulting in poor image transfer. The integrity of the toned image during partial removal of the solvent also depends upon the core $T_g$, with lower $T_g$ promoting film strength and image integrity at the cost of additional image tack. An organosol core $T_g$ below room temperature is preferred to ensure that the toner will in fact film form. Preferably, the minimum film forming temperatures are between about 23°–45° C. and the organosol core $T_g$ is below room temperature to allow the toner to form a film and maintain good image integrity during solvent removal and good cohesive strength during image transfer from the photoconductor onto either a transfer medium or receptor.

The solubility parameter of the core is chosen such that it differs from that of the dispersion medium in order to ensure that the core monomers will phase separate during dispersion polymerization (forming the core). The absolute difference in solubility parameters between the core and the solvent is preferably greater than 3.0 $MPa^{1/2}$. Conversely, the solubility parameter of the shell monomers is chosen to closely match that of the dispersant in order to ensure that the stabilizer will be sufficiently solvated to dissolve in the dispersion medium. Therefore, both the solubility parameter and the glass transition temperature should be considered in selecting the polymerizable organic compounds for use in synthesizing either the core or shell (graft stabilizer) of an organosol to achieve the desired results.

The organosol core comprises approximately 30–95% of the organosol on a weight basis. Thus, the core's $T_g$ will typically dominate over the stabilizer's $T_g$ and the organosol $T_g$ may be taken as a first approximation to be the core $T_g$. A simple algebraic method based upon a composition-weighted sum of inverse $T_g$'s (absolute temperature) can be used to calculate the effective $T_g$ of a copolymer blend used to make-up an organosol core. Similar arguments allow an assumption that the solubility parameter of the stabilizer will generally control the stability of the organosol. Therefore, the stabilizer solubility parameter is preferably selected to closely match that of the dispersant for maximum aggregation stability, but not for gel formation.

Using the data in Table 1 and applying the above criteria, it is noted that monomers such as methyl acrylate, ethyl acrylate and methyl methacrylate are most suitable for incorporation into an organosol core ($T_g$ between –30° C. and –25° C. and solubility parameter far removed from that of Norpar™ 12 having a Hildebrand solubility parameter equal to 14.6 $MPa^{1/2}$). Similarly, monomers such as octadecyl methacrylate, octadecyl acrylate and lauryl methacrylate are most suitable for incorporation into the graft stabilizer (organosol shell).

To yield the best offset transfer efficiency without causing excessive residual tack and blocking of the transferred image, an organosol core having a $T_g$ between –10° C. and 20° C. is preferred, more preferably between –5° C. and 5° C. Under constant transfer roll pressure conditions, lower core $T_g$ organosols exhibit 100% transfer at lower temperatures than high $T_g$ organosols. The results of toner transfer testing have been found to be dependent upon the extent of self-fixing or dryness of the toner film. In addition, toned images will require some finite drying time in order to allow film formation to occur. This drying can be accelerated by using heated air, vacuum drying, an electrostatically-biased or unbiased squeegee (to hydraulically remove excess dispersant) or other similar methods known in the art. For example, the system described in U.S. Pat. No. 5,300,990. The rate of film formation (self-fixing) may also be accelerated by adding a plasticizer to the toned image to effectively lower the minimum film forming temperature.

Residual image tack after transfer may be adversely affected by the presence of high tack monomers, such as ethyl acrylate, in the organosol. Therefore, the organosols are generally formulated such that the organosol core preferably has a glass transition temperature ($T_g$) less than room temperature (25° C.) but greater than −10° C. A preferred organosol core composition contains about 75 weight percent ethyl acrylate and 25 weight percent methyl methacrylate, yielding a calculated core $T_g$ of=−1 ° C. This permits the toners to rapidly self-fix under normal room temperature or higher speed development conditions and also produce tack-free fused images which resist blocking.

Examples of polymerizable organic compounds suitable for use in the organosol core include monomers such as, methyl acrylate, ethyl acrylate, butyl acrylate, methyl (methacrylate), ethyl(methacrylate), butyl(methacrylate) and other acrylates and methacrylates, most preferred being methylmethacrylate and ethylacrylate. Other polymers which may be used either alone or in conjunction with the aforementioned materials, include melamine and melamine formaldehyde resins, phenol formaldehyde resins, epoxy resins, polyester resins, styrene and styrene/acrylic copolymers, vinyl acetate and vinyl acetate/acrylic copolymers, acrylic and methacrylic esters, cellulose acetate and cellulose acetate-butyrate copolymers, and poly(vinyl butyral) copolymers.

The optimal weight ratio of the resin core to the stabilizer shell is on the order of 1/1 to 15/1, preferably between 2/1 and 10/1, and most preferably between 4/1 and 8/1. Undesirable effects may accompany core/shell ratios selected outside of these ranges. For example, at high core/shell ratios (above 15), there may be insufficient graft stabilizer present to sterically-stabilize the organosol with respect to aggregation. At low core/shell ratios (below 1), the polymerization may have insufficient driving force to form a distinct particulate phase resulting in a copolymer solution, not a self-stable organosol dispersion.

The particle size of the organosols also influences the imaging, drying and transfer characteristics of the liquid inks. Preferably, the primary particle size (determined with dynamic light scattering) of the organosol is between about 0.05 and 5.0 microns, more preferably between 0.15 and 1 micron, most preferably between 0.20 and 0.50 microns.

A liquid ink utilizing the aforementioned gel organosol comprises colorant particles embedded in the thermoplastic organosol resin. Useful colorants are well known in the art and include materials such as dyes, stains, and pigments. Preferred colorants are pigments which may be incorporated into the polymer resin, are nominally insoluble in and nonreactive with the carrier liquid, and are useful and effective in making visible the latent electrostatic image. Examples of suitable colorants include: phthalocyanine blue (C.I. Pigment Blue 15: 1, 15:2, 15:3 and 15:4), monoarylide yellow (C .I. Pigment Yellow 1, 3, 65, 73 and 74), diarylide yellow (C.I. Pigment Yellow 12, 13, 14, 17 and 83), arylamide (Hansa) yellow (C.I. Pigment Yellow 10, 97, 105 and 111), azo red (C.I. Pigment Red 3, 17, 22, 23, 38, 48:1, 48:2, 52:1, 81 and 179), quinacridone magenta (C.I. Pigment Red 122, 202 and 209) and black pigments such as finely divided carbon (Cabot Monarch 120, Cabot Regal 300R, Cabot Regal 350R, Vulcan X72) and the like.

The optimal weight ratio of resin to colorant in the toner particles is on the order of 1/1 to 20/1, preferably between 3/1 and 10/1 and most preferably between 5/1 and 8/1. The total dispersed material in the cartier liquid typically represents 0.5 to 70 weight percent, preferably between 1 and 25 weight percent, most preferably between 2 and 12 weight percent of the total liquid developer composition.

The gel organosols of the present invention have been used to fabricate liquid electrophotographic toners which exhibit excellent imaging characteristics in liquid immersion development. For example, the gel organosol liquid toners exhibit low bulk conductivity, low free phase conductivity, low charge/mass and high mobility, all desirable characteristics for producing high resolution, background free images with high optical density. In particular, the low bulk conductivity, low free phase conductivity and low charge/ mass of the toners allow them to achieve high developed optical density over a wide range of solids concentrations, thus improving their extended printing performance relative to conventional toners.

Color liquid toners made according to this invention on development form substantially transparent films which transmit incident light at selected wavelengths (preferably $\geq 700$ nm, more preferably $\geq 780$ nm), consequently allowing the photoconductor layer to discharge, while non-coalescent particles scatter a portion of the incident light. Non-coalesced toner particles therefore result in the decreasing of the sensitivity of the photoconductor to subsequent exposures and consequently there is interference with the overprinted image. This also permits latent image generation by Infrared laser scanning devices.

The toners of the present invention have low $T_g$ values with respect to most available toner materials. This enables the toners of the present invention to form films at room temperature. It is not necessary for any specific drying procedures or heating elements to be present in the apparatus. Normal room temperature (19°–20° C.) is sufficient to enable film forming and of course the ambient internal temperatures of the apparatus during operation which tends to be at a higher temperature (e.g., 25°–40° C.) even without specific heating elements is sufficient to cause the toner or allow the toner to form a film. It is therefore possible to have the apparatus operate at an internal temperature of 40° C. or less at the toning station and immediately thereafter where a fusing operation would ordinarily be located.

The gel organosol liquid toners also exhibit improved transfer characteristics relative to conventional inks used in the art, particularly with offset transfer processes. The rapid-fixing characteristics of the toners permit their use in liquid development/dry adhesive offset transfer imaging processes, such as the process described in co-pending U.S. patent application Kellie, et al. titled "Method and Apparatus having Improved Image Transfer Characteristics for Producing an Image on Plain Paper" filed on Sep. 29, 1995 (FN#52067USA2A). Dry adhesive transfer eliminates the need for coronas or other charging devices to electrostatically assist transfer of a wet image from the imaging surface to the preferred substrate. In addition, dry adhesive transfer of the toner further reduces carry-out of excessive solvent vapors with the image, as would occur with conventional electrostatically-assisted transfer processes.

An electrophotographic liquid toner may be formulated by incorporating a charge control agent into the liquid ink. The charge control agent, also known as a charge director, provides uniform charge polarity of the toner particles. The charge director may be incorporated into the toner particles using a variety of methods, such as chemically reacting the charge director with the toner particle, chemically or physically adsorbing the charge director onto the toner particle (resin or pigment), or chelating the charge director to a functional group incorporated into the toner particle. A preferred method is via a functional group built into the graft stabilizer. The charge director acts to impart an electrical charge of selected polarity onto the toner particles. Any number of charge directors described in the art may be used. For example, the charge director may be introduced in the form of metal salts consisting of polyvalent metal ions and organic anions as the counterion. Suitable metal ions include Ba(II), Ca(ID, Mn(II), Zn(II), Zr(IV), Cu(II), Al(III), Cr(III), Fe(II), Fe(III), Sb(III), Bi(III), Co(II), La(III), Pb(II), Mg(II), Mo(III), Ni(II), Ag(I), Sr(II), Sn(IV), V(V), Y(III), and Ti(IV). Suitable organic anions include carboxylates or sulfonates derived from aliphatic or aromatic carboxylic or sulfonic acids, preferably aliphatic fatty acids such as stearic acid, behenic acid, neodecanoic acid, diisopropylsalicylic acid, octanoic acid, abietic acid, naphthenic acid, octanoic acid, laurie acid, tallic acid, and the like. Preferred positive charge directors are the metallic carboxylates (soaps) described in U.S. Pat. No. 3,411,936, incorporated herein by reference, which include alkaline earth- and heavy-metallic salts of fatty acids containing at least 6–7 carbons and cyclic aliphatic acids including naphthenic acid; more preferred are polyvalent metal soaps of zirconium and aluminum; most preferred is the zirconium soap of octanoic acid (Zirconium HEX-CEM from Mooney Chemicals, Cleveland, Ohio).

The preferred charge direction levels for a given toner formulation will depend upon a number of factors, including the composition of the graft stabilizer and organosol, the molecular weight of the organosol, the particle size of the organosol, the core/shell ratio of the graft stabilizer, the pigment used in making the toner, and the ratio of organosol to pigment. In addition, preferred charge direction levels will also depend upon the nature of the electrophotographic imaging process, particularly the design of the developing hardware and photoreceptive element. Those skilled in the art, however, know how to adjust the level of charge direction based on the listed parameters to achieve the desired results for their particular application.

The conductivity of a liquid toner has been well established in the art as a measure of the effectiveness of a toner in developing electrophotographic images. A range of values from $1.0 \times 10^{-11}$ mho/cm to $10.0 \times 10^{-11}$ mho/cm has been disclosed as advantageous in U.S. Pat. No. 3,890,240. High conductivities generally indicate inefficient association of the charges on the toner particles and is seen in the low relationship between current density and toner deposited during development. Low conductivities indicate little or no charging of the toner particles and lead to very low development rates. The use of charge director compounds to ensure sufficient charge associated with each particle is a common practice. There has, in recent times, been a realization that even with the use of charge directors there can be much unwanted charge situated on charged species in solution in the carrier liquid. Such charge produces inefficiency, instability and inconsistency in the development. U.S. Pat. No. 4,925,766 discloses that at least 40% and preferably at least 80% of the total charge in the liquid toner should be situated and remain on the toner particles.

Suitable efforts to localize the charges onto the toner particles and to ensure that there is substantially no migration of charge from those particles into the liquid, and that no other unwanted charge moieties are present in the liquid, give substantial improvements. As a measure of the required properties, we use the ratio between the conductivity of the carrier liquid as it appears in the liquid toner and the conductivity of the liquid toner as a whole. This ratio must be less than 0.6 preferably less than 0.4 and most preferably less than 0.3. Many prior art toners examined have shown ratios much larger than this, in the region of 0.95.

Any number of methods may be used for effecting particle size reduction of the pigment in preparation of the gel liquid toners. Some suitable methods include high shear homogenization, ball-milling, attritor milling, high energy bead(sand) milling or other means known in the art.

In electrophotographic and electrographic processes, an electrostatic image is formed on the surface of a photoreceptive element or dielectric element, respectively. The photoreceptive element or dielectric element may be an intermediate transfer drum or belt or the substrate for the final toned image itself, as described by Schmidt, S. P. and Larson, J. R. in *Handbook of Imaging Materials* Diamond, A. S., Ed: Marcel Dekker: New York; Chapter 6, pp 227–252, and U.S. Pat. Nos. 4,728,983, 4,321,404, and 4,268,598.

In electrography, a latent image is typically formed by (1) placing a charge image onto the dielectric element (typically the receiving substrate) in selected areas of the element with an electrostatic writing stylus or its equivalent to form a charge image, (2) applying toner to the charge image, and (3) fixing the toned image. An example of this type of process is described in U.S. Pat. No. 5,262,259.

Images formed by the present invention may be of a single color or a plurality of colors. Multicolor images can be prepared by repetition of the charging and toner application steps. Examples of electrophotographic methods suitable for producing full color reproductions are described by U.S. Pat. Nos. 2,297,691; 2,752,833; 2,986,466; 3,690,756; 4,403,848; 4,370,047; 4,467,334; 4,728,983; 5,420,675; co-pending U.S. Pat. Application Kellie, et al. titled "Method and Apparatus for Producing a Multi-colored Image in an Electrophotographic System" filed on Sep. 29, 1995 (FN# 51325USA5A); and European Patent Application No. 0,453,256. Examples of suitable transfer and fixing processes are described in U.S. Pat. Nos. 4,337,303; 5,108, 865 and 5,204,722.

In electrophotography, the electrostatic image is typically formed on a drum or belt coated with a photoreceptive element by (1) uniformly charging the photoreceptive element with an applied voltage, (2) exposing and discharging portions of the photoreceptive element with a radiation source to form a latent image, (3) applying a toner to the latent image to form a toned image, and (4) transferring the toned image through one or more steps to a final receptor sheet. In some applications, it is sometimes desirable to fix the toned image using a heated pressure roller or other fixing methods-known in the art.

While the electrostatic charge of either the toner particles or photoreceptive element may be either positive or negative, electrophotography as employed in the present invention is preferably carried out by dissipating charge on a positively charged photoreceptive element. A positively-charged toner is then applied to the regions in which the positive charge was dissipated using a liquid toner immersion development technique. This development may be accomplished by using a uniform electric field produced by a development electrode spaced near the photoreceptive element surface. A bias voltage is applied to the electrode intermediate to the initially charged surface voltage and the exposed surface voltage level. The voltage is adjusted to obtain the required maximum density level and tone reproduction scale for halftone dots without any background deposited. Liquid toner is then caused to flow between the electrode and the photoreceptive element. The charged toner particles are mobile in the field and are attracted to the discharged areas on the photoreceptive element while being repelled from the undischarged non-image areas. Excess liquid toner remaining on the photoreceptive element is removed by techniques well known in the art, such as those described in U.S. Pat. No. 5,300,990. Thereafter, the photoreceptive element surface may be force dried or allowed to dry at ambient conditions.

A particularly useful electrophotographic process for forming a multi-colored image on a receptor is described in co-pending U.S. patent application Kellie, et al. titled "Method and Apparatus for Producing a Multi-colored Image in an Electrophotographic System" filed on Sep. 29, 1995 (FN# 51325USA5A). Basically, this process involves the steps of (i) applying a uniform positive charge of approximately 600 volts on the surface of a photoreceptive element, (ii) exposing and partially discharging the surface of the photoreceptive element with a laser scanning device in an image-wise pattern to create a latent image, (iii) applying a liquid color toner to the latent image to form both a toned image and a uniform surface charge on the photoreceptive element, (iv) removing excess liquid toner, (v) drying the toned image, and (vi) transferring the toned image either directly or indirectly onto a final receptor. To form multi-colored images, steps (ii) through (v) are repeated until all the desired colors are formed on the photoreceptive element prior to transferring the images either directly or indirectly onto a final receptor. Unlike conventional electrophotographic processes, this process of forming multi-colored images may be accomplished without erasing the residual charge and recharging the surface of the photoreceptive element prior to scanning and developing a subsequent image. The liquid toner of the present invention provides sufficient charge in the imaged areas to allow the creation of a subsequent latent image without erasing and recharging the surface.

According to U.S. Pat. No. 5,061,583, for development of multi-colored half-tone images of the highest quality, the liquid toners may be characterized by two parameters: (1) more than 70% of the conductivity is contributed by the charged toner particles as opposed to the background conductivity contributed by ionic species in solution in the carrier liquid; and (2) the zeta potential of the particles is within a range from 60 mV to 200 mV. In the present invention, the low bulk conductivity, low free phase conductivity, low charge-per-mass and o moderate zeta potential (50-100 mV) are unique characteristics of the gel organosol based toners which provide high resolution and high speed multi-color images in liquid immersion development electrophotographic processes, particularly, when combined with the inverted dual layer photoconductor described in Example 6 of co-pending U.S. patent application SN# 08/43 1022 titled "Release Layer for a Photoconductor," incorporated herein by reference, and the single pass process described above and disclosed in co-pending U.S. patent application Kellie, et al. titled "Method and Apparatus for Producing a Multi-colored Image in an Electrophotographic System" filed on Sep. 29, 1995 (FN# 51325USA5A), incorporated herein by reference. Fast photoreceptive elements generally operate in a region in which the total charge on the photoreceptive is equalized by development of toner, that is, development occurs substantially to completion. Under such conditions, high optical density is favored by low toner charge/mass, or equivalently, low toner charge per unit of developed optical density.

There has in recent times been a realization that even with the use of charge directors there can be much unwanted charge situated on charged species in the liquid medium which is not associated with the toner particles. Such free charged species (if unpigmented and charged to the same polarity as the toner particles) can compete with toner particles in developing the latent image, leading to a reduction in developed optical density. Similarly, free charged species having opposite polarity to the toner particles can develop in non-imaged areas of the photoreceptor, leading to difficulties in depositing subsequent toner layers onto these areas or causing an increase in background within the non-imaged areas.

A good correlation between high optical density, low background toner development, uniform overtoning (overprinting) of one color plane onto another and dot sharpness on the one hand, and low free phase conductivity levels for liquid toners has also been found. Preferably, the percentage of free phase conductivity relative to the bulk toner conductivity will be less than 30%, more preferably less than 20%, most preferably less than 10%.

Once the toned image is formed on the photoreceptive element, the image may then be transferred to a final receptor (e.g., paper or film) using a variety of processes which are known in the art. Preferred processes for effecting transfer of the toner film are offset transfer processes such as those described in U.S. Pat. Nos. 5,108,865; and 5,204,722. The most preferred method of transferring the image from the photoreceptive element to the final receptor is described in co-pending U.S. patent application Kellie, et al. titled "Method and Apparatus having Improved Image Transfer Characteristics for Producing an Image on Plain Paper" filed on Sep. 29, 1995 (FN#52067USA2A), incorporated herein by reference. This method uses an intermediate transfer roll which is coated with a silicone or fluorosilicone elastomer composition and heated to between 80°-100° C. and which applies a force of approximately 40-80 $lb_f$ across the entire contact zone with the photoreceptor. Most preferred is the Dow Corning 94-003 fluorosilicone elastomer heated to between 85°-95° C.

The substrate for receiving the image from the photoreceptive element can be any commonly used receptor material, such as paper, coated paper, polymeric films and primed or coated polymeric films. Polymeric films include plasticized and compounded polyvinyl chloride (PVC), acrylics, polyurethanes, polyethylene/acrylic acid copolymer, and polyvinyl butyrals. Commercially available composite materials such as those having the trade designations Scotchcal™, Scotchlite™, and Panaflex™ are also suitable for preparing substrates.

The transfer of the formed image from the charged surface to the final receptor or transfer medium may be enhanced by the incorporation of a release-promoting material within the dispersed particles used to form the image. The incorporation of a silicone-containing material or a fluorine-containing material in the outer (shell) layer of the particle facilitates the efficient transfer of the image.

Toners are usually prepared in a concentrated form to conserve storage space and reduce transportation costs. In order to use the toners in the printer, the concentrate is diluted with additional carrier liquid to give what is termed the working strength liquid toner. The gel organosol provides an efficient method for formulating a high solids ink.

Unlike other dispersions, the gel organosol will phase separate into two phases; one phase comprising primarily a portion of the carrier liquid and the other phase a concentrated gel organosol dispersion. Once separated, the gel organosol can be simply redispersed with mixing or by removal of the separated carrier liquid form a concentrate of the dispersion. A high solids ink for printing or replenishment may be produced by allowing the organosol to gel and then decanting or siphoning off the supernatant liquid, thus forming a concentrate of the gel polymer in the dispersant liquid. A variety of alternative methods for concentrating the organosol or ink are well known in the art, such as gravity settling, centrifugation, filtration, controlled flocculation, etc. The carrier liquid may be removed either prior to or after the addition of the pigment and/or charge director and either before or after milling the toner. Removal of the separated carrier liquid after the addition of the colorant(s) and charge director to the dispersion has an added advantage of further reducing the percentage of free phase conductivity.

In multicolor imaging, the toners may be applied to the surface of the dielectric element or photoreceptive element in any order, but for colorimetric reasons, bearing in mind the inversion that occurs on transfer, it is sometimes preferred to apply the images in a specified order depending upon the transparency and intensity of the colors. A preferred order for a direct imaging or a double transfer process is yellow, magenta, cyan and black; for a single transfer process, the preferred order is black, cyan, magenta and yellow. Yellow is generally imaged first to avoid contamination from other toners and black is generally imaged last due to the black toner acting as a filter of the radiation source.

In order to function most effectively, liquid toners should have conductance values in the range of 50 to 1200 picomho-cm$^{-1}$. Liquid toners prepared according to the present invention have conductance values of from 100 to 500 picomho-cm$^4$ for a dispersion containing 2.5% by weight solids.

Overcoating of the transferred image may optionally be carried out to protect the image from physical damage and/or actinic damage. Compositions for overcoatings are well known in the art and typically comprise a clear film-forming polymer dissolved or suspended in a volatile solvent. An ultraviolet light absorbing agent may optionally be added to the coating composition. Lamination of protective layers to the image-bearing surface is also well known in the art and may be used with this invention, such as the laminates described in U.S. Pat. No. 4,728,983.

These and other aspects of the present invention are demonstrated in the illustrative examples that follow.

EXAMPLES

The catalysts used in the examples are Azobisisobutyronitrile (designated as AIBN, VAZO™-64 available from DuPont Chemicals, Wilmington, Del.); and Dibutyl Tin Dilaurate (designated as DBTDL, available from Aldrich Chemical Co., Milwaukee, Wis.). The monomers are all available from Scientific Polymer Products, Inc., Ontario, N.Y. unless designated otherwise. It is understood that the listing of this source is not intended to limit the scope of this invention, and that equivalent chemicals are available from alternative suppliers.

The monomers used in the examples are designated by the following abbreviations: n-Butyl Acrylate (BA); n-Butyl Methacrylate (BMA); Ethyl Acrylate (EA); 2-Ethylhexyl Methacrylate (EHMA); n-Hexyl Acrylate (HA); 2-Hydroxyethyl Methacrylate (HEMA); n-Hexyl Methacrylate (HMA); 2-Cyanatoethyl Methacrylate (IEM); Lauryl Acrylate or Dodecyl Acrylate (LA); Lauryl Methacrylate or Dodecyl Methacrylate (LMA); Methyl Methacrylate (MMA); Octadecyl Acrylate or Stearyl Acrylate (ODA); Octadecyl Methacrylate or Stearyl Methacrylate (ODMA); tert-Butyl Methacrylate (TBMA); and Dimethyl-m-isopropenyl benzylisocyanate (TMI, available from CYTEC Industries, West Paterson, N.J.).

The following test methods were used to characterize the polymers of the following examples.

Percent Solids of Graft Stabilizer, Organosol and Liquid Toner

Percent solids of the graft stabilizer solutions and the organosol and ink dispersions were determined gravimetrically using an infrared drying oven attachment to a precision analytical balance (Mettler Instruments, Inc., Hightstown, N.J.). Approximately two grams of sample were used in each determination of percent solids using this sample dry down method.

Graft Stabilizer Molecular Weight

Various properties of the graft stabilizer have been determined to be important to the performance of the stabilizer, including molecular weight and molecular weight polydispersity. Graft stabilizer molecular weight is normally expressed in terms of the weight average molecular weight ($M_w$), while molecular weight polydispersity is given by the ratio of the weight average molecular weight to the number average molecular weight ($M_w/M_n$). Molecular weight parameters were determined for graft stabilizers with gel permeation chromatography (GPC) using tetrahydrofuran as the carrier solvent. Absolute $M_w$ was determined using a Dawn DSP-F light scattering detector (Wyatt Technology Corp., Santa Barbara, Calif.), while polydispersity was evaluated by ratioing the measured $M_w$ to a value of $M_n$ determined with an Optilab 903 differential refractometer detector (Wyatt Technology Corp, Santa Barbara, Calif.).

Organosol Particle Size

Organosol particle size was determined by dynamic light scattering on a diluted toner sample (typically <0.0001 g/mL) using a Malvern Zetasizer III Photon Correlation Spectrometer (Malvern Instruments Inc., Southborough, Mass.). The dilute samples were ultrasonicated for one minute at 100 watts and 20 kiloHz (kHz) prior to measurement. Dynamic light scattering provides a fast method of determining the particle translational diffusion coefficient, which can be related to the z-average particle diameter without detailed knowledge of the optical and physical properties (i.e. refractive index, density and viscosity) of the organosol. Details of the method are described in Chu, B., *Laser Scattering* Academic Press, N.Y., 11A (1974). Since the organosols are comprised of nearly monodisperse, uniform spherical particles, dynamic light scattering provides an absolute measure of particle size for particles having diameters between 25–2500 nm. cl Liquid Toner Properties The characterization of a liquid toner requires the measurement of a number of physical and chemical properties of the toner as well as direct evaluation of image quality obtained by developing the toner in a liquid electrophotographic imaging mechanism. The measured toner characteristics can be roughly broken down into size-related properties (particle size), charge-related properties (bulk and free phase conductivity, dynamic mobility and zeta potential, and charge/developed reflectance optical density (Q/ROD), a parameter which is directly proportional to the toner charge/mass.

Particle Size

Toner particle size distributions were determined using a Horiba LA-900 laser diffraction particle size analyzer (Horiba Instruments, Inc., Irvine, Calif.). Toner samples were diluted approximately 1/1500 by volume and sonicated for one minute at 150 watts and 20 kHz prior to measurement. Toner particle size was expressed on a number-average basis in order to provide an indication of the fundamental (primary) particle size of the ink particles.

Toner Conductivity

The liquid toner conductivity (bulk conductivity, $k_b$) was determined at approximately 18 Hz using a Scientifica model 627 conductivity meter (Scientifica Instruments, Inc., Princeton, N.J.). In addition, the free (dispersant) phase conductivity ($k_f$) in the absence of toner particles was also determined. Toner particles were removed from the liquid medium by centrifugation at 5° C. for 1–2 hours at 6,000 rpm (6,110 relative centrifugal force) in a Jouan MR1822 centrifuge (Winchester, Vir.). The supernatant liquid was then carefully decanted, and the conductivity of this liquid was measured using a Scientifica Model 627 conductance meter operating. The percentage of free phase conductivity relative to the bulk toner conductivity was then determined as: $100\% \ (k_f/k_b)$.

Particle Mobility

Toner particle electrophoretic mobility (dynamic mobility) was measured using a Matec MBS-8000 Electrokinetic Sonic Amplitude Analyzer (Matec Applied Sciences, Inc., Hopkinton, Mass.). Unlike electrokinetic measurements based upon microelectrophoresis, the MBS-8000 instrument has the advantage of requiring no dilution of the toner sample in order to obtain the mobility value. Thus, it was possible to measure toner particle dynamic mobility at solids concentrations actually preferred in printing. The MBS-8000 measures the response of charged particles to high frequency (1.2 MHz) alternating (AC) electric fields. In a high frequency AC electric field, the relative motion between charged toner particles and the surrounding dispersion medium (including counter-ions) generates an ultrasonic wave at the same frequency of the applied electric field. The amplitude of this ultrasonic wave at 1.2 MHz can be measured using a piezoelectric quartz transducer; this electrokinetic sonic amplitude (ESA) is directly proportional to the low field AC electrophoretic mobility of the particles. The particle zeta potential can then be computed by the instrument from the measured dynamic mobility and the known toner particle size, dispersant liquid viscosity and liquid dielectric constant.

Particle Charge

Toner charge/mass is an important, albeit difficult to determine parameter useful in predicting the development characteristics (e.g. optical density, overtoning uniformity) for liquid toners. The difficult in determining charge/mass for liquid toners arises from the low developed toner mass (typically 50–200 micro grams/cm$^2$) associated with the desired developed optical densities (typically>1.2 reflectance optical density units). A related parameter which is directly proportional to toner charge/mass is the toner charge/developed optical density. This parameter was determined by plating ink particles in distinct bands covering a range of known plating potentials onto a dielectric sheet coated with a silicone release layer while simultaneously monitoring the total current flow with a sensitive electrometer. The resulting plated toner layer was then air dried and transferred using an offset transfer process to plain paper. The reflectance optical density of the completely transferred toner film on paper was determined using a Gretag SPM50 reflectance optical densitometer (Gretag Instruments Inc., Regensdorf, Switzerland). The ratio of the total current to the product of the plated toner area and the developed optical density yields the charge/ROD value for that toner, i.e. Charge/ROD=(Total Current)/[(Plated Area)CReflectance Optical Density)].

Examples 1–8 describe preparations for different types of copolymer graft stabilizers; Examples 9–16 describe preparations for different types of terpolymer graft stabilizers; Examples 17–19 describe preparations for graft stabilizers in alternative solvent systems; Examples 20–25 illustrate comparative non-gel organosols and gel organosols based on copolymer graft stabilizers; Examples 26–33 illustrate comparative non-gel organosols and gel organosols based on terpolymer graft stabilizers; Examples 34–36 illustrate gel organosols formed in alternative solvent systems; Examples 37–40 illustrate liquid color toners based on gel organosols; and Examples 41 and 42 illustrate different methods of preparing a high solids toner.

GRAFT STABILIZERS

We will now describe various methods for obtaining a gel organosol. The crux of the invention lies in manipulating the composition of a preformed graft stabilizer such that this (co)polymer is near its incipient phase separation point in the dispersant liquid. The resulting graft stabilizer remains in a freely flowing, easily handled solution, yet forms a gel organosol when covalently bonded to the insoluble core of a nascent organosol in a subsequent polymerization step.

In Table II, we have tabulated the calculated values of Hildebrand solubility parameter for the monomer blends comprising the graft stabilizer precursors prepared in each of the following examples. We have excluded the solubility parameter contribution from the grafting site incorporated into each graft stabilizer to illustrate that the method of forming a gel organosol is not dependent on any particular grafting mechanism. This is a reasonable approximation, since in all cases, the grafting site contributes less than 7.5% (w/w) to the total composition of the graft stabilizer.

Table II also lists values of Hildebrand solubility parameter for the solvents or solvent blends used in each example. The Hildebrand solubility parameters for the commercially available hydrocarbon blends used in our examples (i.e. Norpaff™ 12, Norpar™ 13, Isopar™ V and Exxsol™ D80) were calculated from the known Kauri-butanol values for these solvents as provided by their manufacturer.

TABLE II

| Example Number | Graft Stabilizer Composition (% w/w) | Stabilizer Hildebrand Solubility Parameter (MPa$^{1/2}$) | Dispersant Liquid | Dispersant Hildebrand Solubility Parameter (MPa$^{1/2}$) | Hildebrand Solubility Parameter Difference (|MPa$^{1/2}$|) |
|---|---|---|---|---|---|
| 1 Comparative | LMA/HEMA-TMI 97/3–4.7 | 16.84 | Norpar™ 12 | 14.30 | 2.54 |
| 2 Comparative | BMA/HEMA-TMI 97/3 | 17.22 | Norpar™ 12 | 14.30 | 2.92 |
| 3 | EHMA/HEMA-TMI 97/3–4.7 (M$_w$ 202,100 DA) | 16.97 | Norpar™ 12 | 14.30 | 2.67 |
| 4 | EHMA/HEMA-TMI 97/3–4.7 (M$_w$ 379,050 DA) | 16.97 | Norpar™ 12 | 14.30 | 2.67 |
| 5 Comparative | LA/HEMA-TMI 97/3–4.7 | 16.95 | Norpar™ 12 | 14.30 | 2.65 |
| 6 Comparative | TBMA/HEMA 97/3 | 17.16 | Norpar™ 12 | 14.30 | 2.86 |
| 7 | HMA/HEMA-TMI 97/3–4.7 | 17.13 | Norpar™ 12 | 14.30 | 2.83 |
| 8 | HA/HEMA-TMI 97/3–4.7 | 17.30 | Norpar™ 12 | 14.30 | 3.00 |
| 9 Comparative | ODA/ODMA/HEMA-TMI 48.5/48.5/3–4.7 | 16.79 | Norpar™ 12 | 14.30 | 2.49 |
| 10 Comparative | LMA/EHMA/HEMA-TMI 72.75/24.25/3–4.7 | 16.87 | Norpar™ 12 | 14.30 | 2.57 |
| 11 Comparative | LMA/EHMA/HEMA-TMI 48.5/48.5/3–4.7 | 16.90 | Norpar™ 12 | 14.30 | 2.60 |
| 12 | LMA/EHMA/HEMA-TMI 24.25/72.75/3–4.7 | 16.94 | Norpar™ 12 | 14.30 | 2.60 |
| 13 | ODMA/BA/HEMA-TMI 72.75/24.25/3–4.7 | 16.93 | Norpar™ 12 | 14.30 | 2.63 |
| 14 | ODA/TBMA/HEMA-TMI 24.25/72.75/3–4.7 | 17.07 | Norpar™ 12 | 14.30 | 2.77 |
| 15 | LMA/HMA/HEMA-TMI 24.25/72.75/3–4.7 | 17.06 | Norpar™ 12 | 14.30 | 2.76 |
| 16 | LA/EHMA/HEMA-TMI 48.5/48.5/3–4.7 | 16.96 | Norpar™ 12 | 14.30 | 2.66 |
| 17 | EHMA/HEMA-TMI 97/3–4.7 | 16.97 | Norpar™ 13 | 14.24 | 2.73 |
| 18 | EHMA/HEMA-TMI 97/3–4.7 | 16.97 | Isopar™ V | 14.42 | 2.55 |
| 19 | EHMA/HEMA-TMI 97/3–4.7 | 16.97 | Exxsol™ D80 | 14.60 | 2.37 |

In the following examples of graft stabilizer preparation, it will be convenient to summarize the compositional details of each particular graft stabilizer by ratioing the weight percentages of monomers used to create the graft stabilizer precursor. The grafting site composition is then expressed as a weight percentage of the monomers comprising this graft stabilizer precursor. For example, a graft stabilizer designated ODA/ODMA/HEMA-TMI (48.5/48.5/3–4.7 % w/w) is made from a graft stabilizer precursor which is a copolymer consisting of 48.5 weight percent ODA, 48.5 weight percent ODMA and 3.0 percent HEMA, to which is covalently bonded a grafting site consisting of 4.7 weight percent TMI based on the total weight of the graft stabilizer precursor.

Preparations of Copolymer Graft Stabilizers

Example 1 (Comparative)

A 5000 mL 3-necked round bottom flask equipped with a condenser, a thermocouple connected to a digital temperature controller, a nitrogen inlet tube connected to a source of dry nitrogen and a magnetic stirrer, was charged with a mixture of 2373 g of Norpar™ 12, 1019 g of LMA, 33 g of 96% HEMA and 10.5 g of AIBN. While magnetically-stirring the mixture, the reaction flask was purged with dry nitrogen for 30 minutes at a flowrate of approximately 2 liters/minute. A hollow glass stopper was then inserted into the open end of the condenser and the nitrogen flowrate was reduced to approximately 0.5 liters/min. The mixture was heated to 70° C. with stirring, and the mixture was allowed to polymerize at 70° C. for 16 hours. The conversion was quantitative.

The mixture was heated to 90° C. and held at that temperature for 1 hour to destroy any residual AIBN, then was cooled back to 70° C. The nitrogen inlet tube was then removed, and 16.3 g of 95% DBTDL were added to the mixture, followed by 49.4 g of TMI. The TMI was added dropwise over the course of approximately five minutes while magnetically stirring the reaction mixture. The nitrogen inlet tube was replaced, the hollow glass stopper in the condenser was removed, and the reaction flask was purged with dry nitrogen for 30 minutes at a flowrate of approximately 2 liters/minute. The hollow glass stopper was reinserted into the open end of the condenser and the nitrogen flowrate was reduced to approximately 0.5 liters/min. The mixture was allowed to react at 70° C. for 6 hours, at which time the conversion was quantitative.

The mixture was then cooled to room temperature. The cooled mixture was a viscous, transparent liquid containing no visible insoluble matter. The percent solids of the liquid mixture was determined as 30.0% using the infrared drying method described above. Subsequent determination of molecular weight was made using the GPC method described above; the copolymer had a $M_w$ of 197,750 Da and a $M_w/M_n$ of 1.84 based upon two independent measurements. The product is a copolymer of LMA and HEMA containing random side chains of TMI and is designated herein as LMA/HEMA-TMI (97/3-4.7 % w/w) and is suitable for preparing a non-gel organosol.

Example 2 (Comparative)

A 2000 mL 3-necked round bottom flask equipped with a condenser, a thermocouple connected to a digital temperature controller, a nitrogen inlet tube connected to a source of dry nitrogen and a magnetic stiffer, was charged with a mixture of 937.7 g of Norpar™ 12, 322.5 g of BMA, 10.0 g of 96% HEMA and 3.33 g of AIBN. While magnetically-stirring the mixture, the reaction flask was purged with dry nitrogen for 30 minutes at a flowrate of approximately 1 liter/minute. A hollow glass stopper was then inserted into the open end of the condenser and the nitrogen flowrate was reduced to approximately 0.5 liters/min. The mixture was heated to 70° C. with stirring, and the mixture was allowed to polymefize at 70° C. for 16 hours. The conversion was quantitative.

The mixture was heated to 90° C. and held at that temperature for 1 hour to destroy any residual AIBN, then was cooled back to 70° C. The nitrogen inlet tube was then removed, and 5.16 g of 95% DBTDL were added to the mixture, followed by 15.6 g of TMI. The TMI was added dropwise over the course of approximately five minutes while magnetically stirring the reaction mixture. The nitrogen inlet tube was replaced, the hollow glass stopper in the condenser was removed, and the reaction flask was purged with dry nitrogen for 30 minutes at a flowrate of approximately 1 liter/minute. The hollow glass stopper was reinserted into the open end of the condenser and the nitrogen flowrate was reduced to approximately 0.5 liters/min. The mixture was allowed to react at 70° C. for 6 hours, at which time the conversion was quantitative.

The mixture was then cooled to room temperature. The cooled mixture was a viscous, cloudy, semi-opaque liquid which phase separated upon cooling to precipitate an insoluble mass of polymer. No attempt was made to incorporate a grafting site onto this polymer. The percent solids of the mixture was not determined, nor was the molecular weight of the polymer product measured. The product is a copolymer of BMA and HEMA containing random side chains of TMI and is designated herein as BMA/HEMA-TMI (97/3 % w/w) and is not suitable for use in preparing a gel organosol.

Example 3

Using the method and apparatus of Example 1, 2560 g of NORPAR 12, 849 g of EHMA, 27 g of 96% HEMA and 8.8 g of AIBN were combined and the resulting mixture reacted at 70° C. for 16 hours. The mixture was then heated to 90° C. for 1 hour to destroy any residual AIBN, then was cooled back to 70° C. To the cooled mixture was then added 13.6 g of 95% DBTDL and 41.1 g of TMI. The TMI was added dropwise over the course of approximately five minutes while magnetically stirring the reaction mixture. Following the procedure of Example 1, the mixture was reacted at 70° C. for approximately 6 hours at which time the reaction was quantitative. The mixture was then cooled to room temperature. The cooled mixture was a viscous, transparent solution, containing no visible insoluble matter.

The percent solids of the liquid mixture was determined to be 27.42% using the infrared drying method described above. Subsequent determination of molecular weight was made using the GPC method described above; the copolymer had a $M_w$ of 202,100 Da and $M_w/M_n$ of 2.17 based on two independent measurements. The product is a copolymer of EHMA and HEMA containing random side chains of TMI and is designated herein as EHMA/HEMA-TMI (97/3-4.7% w/w) and is suitable for making a gel organosol.

Example 4

This is an example of a high molecular weight graft stabilizer which can be used to produce a gel organosol. This example is also illustrative of methods for varying the molecular weight of the graft stabilizer. Such methods are known to those skilled in the art, and include, but are not limited to, variation of initiator concentration, temperature and total reactant concentration. Using the method and apparatus of Example 2, 910 g of NORPAR 12, 353 g of EHMA, 11 g of 96% HEMA and 2.5 g of AIBN were combined in a reaction flask and the resulting mixture reacted at 64° C. for 16 hours. The mixture was then heated to 90° C. for 1 hour to destroy any residual AIBN, then was cooled back to 70° C. To the cooled mixture was then added 5.6 g of 95% DBTDL and 17.1 g of TMI. The TMI was added dropwise over the course of approximately five minutes while magnetically stirring the reaction mixture. Following the procedure of Example 1, the mixture was reacted at 70° C. for approximately 6 hours at which time the reaction was quantitative. The mixture was then cooled to room temperature. The cooled mixture was a highly viscous, transparent liquid syrup, containing no visible insoluble matter.

The percent solids of the liquid mixture was determined to be 29.66% using the infrared drying method described above. Subsequent determination of molecular weight was made using the GPC method described above; the copolymer had a $M_w$ of 379,050 Da and $M_w/M_n$ of 2.40 based on two independent measurements. The product is a copolymer of EHMA and HEMA containing random side chains of TMI and is designated herein as EHMA/HEMA-TMI (97/3-4.7% w/w) and is suitable for making a gel organosol.

Example 5 (Comparative)

An 8 ounce (0.24 liter), narrow-mouthed glass bottle was charged with 36.58 g of NORPAR 12, 12.13 g of LA, 0.39 g of 96% HEMA and 0.13 g of AIBN. The bottle was purged for one minute with dry nitrogen at a rate of approximately 1.5 liters/minute, then sealed with a screw cap fitted with a Teflon liner. The cap was secured in place using electrical tape. The sealed bottle was then inserted into a metal cage assembly and installed on the agitator assembly of an Atlas Launder-Ometer (Atlas Electric Devices Company, Chicago, Ill.). The Launder-Ometer was operated at its fixed agitation speed of 42 rpm with a water bath temperature of 70° C. The mixture was allowed to react for approximately 16–18 hours, at which time the conversion of monomer to polymer was quantitative. The mixture was heated to 90° C. for 1 hour to destroy any residual AIBN, then was cooled to room temperature.

The bottle was then opened and 0.19 g of 95% DBTDL and 0.59 g of TMI were added to the cooled mixture. The bottle was purged for 1 minute with dry nitrogen at a rate of approximately 1.5 liters/minute, then sealed with a screw cap fitted with a teflon liner. The cap was secured in place using electrical tape. The sealed bottle was then inserted into a metal cage assembly and installed on the agitator assembly of the Atlas Launder-Ometer. The Launder-Omelet was operated at its fixed agitation speed of 42 rpm with a water bath temperature of 70° C. The mixture was allowed to react for approximately 4–6 hours, at which time the conversion was quantitative. The mixture was then cooled to room temperature. The cooled mixture was a viscous, cloudy solution, containing a small amount of visibly phase separated polymer in the form of a thin sediment layer.

The percent solids of the liquid mixture was determined as 26.12% using the infrared drying method described above. Subsequent determination of molecular weight was made using the GPC method described above; the copolymer had a $M_w$ of 204,500 Da and a $M_w/M_n$ of 2.385 based upon two independent measurements. The product is a copolymer of LA and HEMA containing random side chains of TMI and is designated herein as LA/HEMA-TMI (97/3-4.7% w/w) and can be used to prepare a non-gel organosol.

Example 6 (Comparative)

Using the method and apparatus of Example 5, 36.58 g of NORPAR 12, 12.13 g of TBMA, 0.39 g of 96% HEMA and 0.13 g of AIBN were combined in a reaction bottle. The resulting mixture reacted at 70° C. for 16–18 hours. The mixture was heated to 90° C. for 1 hour to destroy any residual AIBN, then was cooled to room temperature.

The cooled mixture was a viscous, cloudy, semi-opaque liquid containing a large amount of visually phase separated polymer in the form of a thick sediment layer. No attempt was made to incorporate a grafting site into the polymer. The percent solids of the mixture was not determined, nor was the molecular weight of the polymer product measured. The product is a copolymer of TBMA and HEMA and is designated herein as TBMA/HEMA (97/3% w/w) and is not suitable for use in preparing a gel organosol.

Example 7

Using the method and apparatus of Example 5, 36.58 g of NORPAR 12, 12.13 g of HMA, 0.39 g of 96% HEMA and 0.13 of AIBN were combined in a reaction bottle and the resulting mixture reacted at 70° C. for 16–18 hours. The mixture was heated to 90° C. for 1 hour to destroy any residual AIBN, then was cooled to room temperature. To the cooled mixture was then added 0.19 g of 95% DBTDL and 0.59 g of TMI. Following the procedure of Example 5, the mixture was reacted at 70° C. for approximately 4–6 hours, at which time the conversion was quantitative. The mixture was then cooled to room temperature. The cooled mixture was a viscous, cloudy solution which contained a moderate amount of visibly phase separated insoluble polymer in the form of a sediment layer.

The percent solids of the liquid mixture was determined as 26.20% using the infrared drying method described above. Subsequent determination of molecular weight was made using the GPC method described above; the copolymer had a $M_w$ of 148,800 Da and a $M_w/M_n$ of 1.65 based upon two independent measurements. The product is a copolymer of HMA and HEMA containing random side chains of TMI and is designated herein as HMA/HEMA-TMI (97/3-4.7% w/w) and is suitable for making a gel organosol.

Example 8

Using the method and apparatus of Example 5, 40.24 g of NORPAR 12, 13.34 g of HA, 0.43 g of 96% HEMA and 0.138 g of AIBN were combined in a reaction bottle and the resulting mixture reacted at 70° C. for 16–18 hours. The mixture was then heated to 90° C. for 1 hour to destroy any residual AIBN, then was cooled to room temperature. To the cooled mixture was then added 0.213 g of 95% DBTDL and 0.646 g of TMI. Following the procedure of Example 5, the mixture was reacted at 70° C. for approximately 4–6 hours at which time the reaction was quantitative. The mixture was then cooled to room temperature. The cooled mixture was a slightly viscous, translucent solution which contained a very small quantity of visibly phase separated insoluble polymer.

The percent solids of the liquid mixture was determined to be 25.49% using the infrared drying method described above. Subsequent determination of molecular weight was made using the GPC method described above; the copolymer had a $M_w$ of 94, 145 Da and $M_w/M_n$ of 1.70 based on two independent measurements. The product is a copolymer of HA and HEMA containing random side chains of TMI and is designated herein as HA/HEMA-TMI (97/3-4.7% w/w) and is suitable for making a gel organosol.

Preparations of Terpolymer Graft Stabilizers

Example 9 (Comparative)

Using the method and apparatus of Example 1, 2049 g of NORPAR 12, 832 g of ODA @ 61.18% in Toluene, 509 g ODMA, 33 g of 96% HEMA and 10.5 g of AIBN were combined in a reaction flask. The resulting mixture reacted at 70° C. for 16 hours. The mixture was then heated to 90° C. for 1 hour to destroy any residual AIBN, then was cooled back to 70° C. To the cooled mixture was then added 16.3 g of 95% DBTDL and 49.4 g of TMI. The TMI was added dropwise over the course of approximately five minutes while magnetically stirring the reaction mixture. Following the procedure of Example 1, the mixture was reacted at 70° C. for approximately 6 hours at which time the reaction was quantitative. The mixture was then cooled to room temperature. The cooled mixture was a viscous, light yellow-colored, transparent liquid.

The percent solids of the liquid mixture was determined to be 32.31% using the infrared drying method described above. Subsequent determination of molecular weight was made using the GPC method described above; the copolymer had a $M_w$ of 175,141 Da and $M_w/M_n$ of 4.27 based on two independent measurements. The product is a terpolymer containing ODA, ODMA and HEMA having random side chains of TMI and is designated herein as ODA/ODMA/HEMA-TMI (48.5/48.5/3-4.7% w/w) and can be used to prepare a non-gel organosol.

Example 10 (Comparative)

Using the method of Example 5, 36.58 g of NORPAR 12, 9.09 g of LMA, 3.03 g of EHMA, 0.39 g of 96% HEMA and 0.13 g of AIBN were combined in a reaction bottle and the resulting mixture reacted at 70° C. for 16–18 hours. The mixture was then heated to 90° C. for 1 hour to destroy any residual AIBN, then was cooled to room temperature. To the cooled mixture was then added 0.19 g of 95% DBTDL and 0.59 g of TMI. Following the procedure of Example 5, the mixture was reacted at 70° C. for approximately 4–6 hours at which time the reaction was quantitative. The mixture was then cooled to room temperature. The cooled mixture was a slightly viscous, transparent solution which contained no visibly phase separated polymer.

The percent solids of the liquid mixture was determined to be 26.5% using the infrared drying method described above. Subsequent determination of molecular weight was made using the GPC method described above; the copolymer had a $M_w$ of 167,250 Da and $M_w/M_n$ of 2.06 based on two independent measurements. The product is a terpolymer containing LMA, EHMA and HEMA having random side chains of TMI and is designated herein as LMA/EHMA/HEMA-TMI (72.75/24.25/3-4.7% w/w) and can be used to prepare a non-gel organosol.

Example 11 (Comparative)

Using the method of Example 5, 36.58 g of NORPAR 12, 6.06 g of LMA, 6.06 g of EHMA 0.39 g of 96% HEMA and 0.13 g of AIBN were combined in a reaction bottle and the resulting mixture reacted at 70° C. for 16–18 hours. The mixture was then heated to 90° C. for 1 hour to destroy any residual AIBN, then was cooled to room temperature. To the cooled mixture was then added 0.19 g of 95% DBTDL and 0.59 g of TMI. Following the procedure of Example 5, the mixture was reacted at 70° C. for approximately 4–6 hours at which time the reaction was quantitative. The mixture was then cooled to room temperature. The cooled mixture was a slightly viscous, clear solution containing no visibly phase separated polymer.

The percent solids of the liquid mixture was determined to be 26.09% using the infrared drying method described above. Subsequent determination of molecular weight was made using the GPC method described above; the copolymer had a $M_w$ of 154,100 Da and $M_w/M_n$ of 2.06 based on two independent measurements. The product is a terpolymer containing LMA, EHMA and HEMA having random side chains of TMI and is designated herein as LMA/EHMA/HEMA-TMI (48.5/48.5/3-4.7% w/w) and can be used to prepare a non-gel organosol.

Example 12

Using the method of Example 5, 36.58 g of NORPAR 12, 3.03 g of LMA, 9.09 g of EHMA, 0.39 g of 96% HEMA and 0.13 g of AIBN were combined and the resulting mixture reacted at 70° C. for 16–18 hours. The mixture was then heated to 90° C. for 1 hour to destroy any residual AIBN, then was cooled to room temperature. To the cooled mixture was then added 0.19 g of 95% DBTDL and 0.59 g of TMI. Following the procedure of Example 5, the mixture was reacted at 70° C. for approximately 4–6 hours at which time the reaction was quantitative. The mixture was then cooled to room temperature. The cooled mixture was a viscous, clear solution containing no visibly phase separated polymer.

The percent solids of the liquid mixture was determined to be 26.5% using the infrared drying method described above. Subsequent determination of molecular weight was made using the GPC method described above; the copolymer had a $M_w$ of 199,800 Da and $M_w/M_n$ of 1.88 based on two independent measurements. The product is a terpolymer of LMA, EHMA and HEMA containing random side chains of TMI and is designated herein as LMA/EHMA/HEMA-TMI (24.25/72.75/3-4.7% w/w) and can be used to prepare a gel organosol.

Example 13

Using the method of Example 5, 37.28 g of NORPAR 12, 12 g of ODMA, 4 g of BA, 0.516 g of 96% HEMA and 0.165 g of AIBN were combined in a reaction bottle and the resulting mixture reacted at 70° C. for 16–18 hours. The mixture was then heated to 90° C. for 1 hour to destroy any residual AIBN, then was cooled to room temperature. To the cooled mixture was then added 0.256 g of 95% DBTDL and 0.776 g of TMI. Following the procedure of Example 5, the mixture was reacted at 70° C. for approximately 4–6 hours at which time the reaction was quantitative. The mixture was then cooled to room temperature. The cooled mixture was a highly viscous, clear solution containing no visibly phase separated polymer.

The percent solids of the liquid mixture was determined to be 31.79% using the infrared drying method described above. Subsequent determination of molecular weight was made using the GPC method described above; the copolymer had a $M_w$ of 867,800 Da and $M_w/M_n$ of 2.00 based on two independent measurements. The product is a polymer containing ODMA, BA and HEMA having random side chains of TMI and is designated herein as ODMA/BA/HEMA-TMI (72.75/24.25/3-4.7% w/w) and can be used to make a gel organosol.

Example 14

Using the method of Example 5, 34.62 g of NORPAR 12, 6.67 g of 60% ODA in toluene, 12.00 g of TBMA, 0.516 g of 96% HEMA and 0.165 g of AIBN were combined in a reaction bottle and the resulting mixture reacted at 70° C. for 16–18 hours. The mixture was then heated to 90° C. for 1 hour to destroy any residual AIBN, then was cooled to room temperature. To the cooled mixture was then added 0.256 g of 95% DBTDL and 0.776 g of TMI. Following the procedure of Example 5, the mixture was reacted at 70° C. for approximately 4–6 hours at which time the reaction was quantitative. The mixture was then cooled to room temperature. The cooled mixture was a viscous, cloudy solution, containing a large amount of visibly phase separated polymer in the form of a thick sediment layer.

The percent solids of the liquid mixture was determined to be 33.28% using the infrared drying method described above. Subsequent determination of molecular weight was made using the GPC method described above; the copolymer had a $M_w$ of 126, 100 Da and $M_w/M_n$ of 2.00 based on two independent measurements. The product is a terpolymer containing ODA, TBMA and HEMA having random side chains of TMI and is designated herein as ODA/TBMA/HEMA-TMI (24.25/72.75/3-4.7% w/w) and can be used to make a gel organosol.

Example 15

Using the method and apparatus of Example 5, 37.28 g of NORPAR 12, 4.00 g of LMA, 12.00 g of HMA, 0.516 g of 96% HEMA and 0.165 g of AIBN were combined in a reaction bottle and the resulting mixture reacted at 70° C. for 16–18 hours. The mixture was then heated to 90° C. for 1 hour to destroy any residual AIBN, then was cooled to room temperature. To the cooled mixture was then added 0.256 g of 95% DBTDL and 0.776 g of TMI. Following the procedure of Example 5, the mixture was reacted at 70° C. for approximately 4–6 hours at which time the reaction was quantitative. The mixture was then cooled to room temperature. The cooled mixture was a viscous, transparent solution containing no visibly phase separated polymer.

The percent solids of the liquid mixture was determined to be 31.90% using the infrared drying method described above. Subsequent determination of molecular weight was made using the GPC method described above; the copolymer had a $M_w$ of 170,850 Da and $M_w/M_n$ of 1.96 based on two independent measurements. The product is a terpolymer containing LMA, HMA and HEMA having random side chains of TMI and is designated herein as LMA/HMA/HEMA-TMI (24.25/72.75/3-4.7% w/w) and can be used to make a gel organosol.

Example 16

Using the method and apparatus of Example 5, 36.58 g of NORPAR 12, 6.06 g of LA, 6.06 g of EHMA, 0.39 g of 96% HEMA and 0.13 g of AIBN were combined in a reaction bottle and the resulting mixture reacted at 70° C. for 16–18 hours. The mixture was then heated to 90° C. for 1 hour to destroy any residual AIBN, then was cooled to room temperature. To the cooled mixture was then added 0.19 g of 95% DBTDL and 0.59 g of TMI. Following the procedure of Example 5, the mixture was reacted at 70° C. for approximately 4–6 hours at which time the reaction was quantitative. The mixture was then cooled to room temperature. The cooled mixture was a viscous, slightly cloudy solution containing a very small amount of visibly phase separated polymer.

The percent solids of the liquid mixture was determined to be 26.88% using the infrared drying method described above. Subsequent determination of molecular weight was made using the GPC method described above; the copolymer had a $M_w$ of 208,300 Da and $M_w/M_n$ of 2.36 based on two independent measurements. The product is a terpolymer containing LA, EHMA and HEMA having random side chains of TMI and is designated herein as LA/EHMA/HEMA-TMI (48.5/48.5/3-4.7% w/w) and can be used to make a gel organosol.

Preparations of Graft Stabilizers in Alternative Solvent Systems

Example 17

This is an example of a graft stabilizer which can be used to produce a gel organosol in a solvent having a Hildebrand solubility parameter lower than that of NORPAR 12. Using the method and apparatus of Example 1, 2560 g of NORPAR 13, 849 g of EHMA, 27 g of 96% HEMA and 8.8 g of AIBN were combined in a reaction flask and the resulting mixture reacted at 70° C. for 16 hours. The mixture was then heated to 90° C. for 1 hour to destroy any residual AIBN, then was cooled back to 70° C. To the cooled mixture was then added 13.6 g of 95% DBTDL and 41.1 g of TMI. The TMI was added dropwise over the course of approximately five minutes while magnetically stirring the reaction mixture. Following the procedure of Example 1, the mixture was reacted at 70° C. for approximately 6 hours at which time the reaction was quantitative. The mixture was then cooled to room temperature. The cooled mixture was a viscous, transparent liquid.

The percent solids of the liquid mixture was determined to be 26.8% using the infrared drying method described above. Subsequent determination of molecular weight was made using the GPC method described above; the copolymer had a $M_w$ of 168,400 Da and $M_w/M_n$ of 2.10 based on two independent measurements. The product is a copolymer of EHMA and HEMA containing random side chains of TMI and is designated herein as EHMA/HEMA-TMI (97/3-4.7% w/w) and can be used to prepare a gel organosol in NORPAR 13.

Example 18

This is an example of a graft stabilizer which can be used to produce a gel organosol in a solvent having a solubility parameter higher than that of NORPAR 12. Using the method and apparatus of Example 1, 2560 g of ISOPAR V, 849 g of EHMA, 27 g of 96% HEMA and 8.8 g of AIBN were combined in a reaction flask and the resulting mixture reacted at 70° C. for 16 hours. The mixture was then heated to 90° C. for 1 hour to destroy any residual AIBN, then was cooled back to 70° C. To the cooled mixture was then added 13.6 g of 95% DBTDL and 41.1 g of TMI. The TMI was added dropwise over the course of approximately five minutes while magnetically stirring the reaction mixture. Following the procedure of Example 1, the mixture was reacted at 70° C. for approximately 6 hours at which time the reaction was quantitative. The mixture was then cooled to room temperature. The cooled mixture was a viscous, transparent liquid.

The percent solids of the liquid mixture was determined to be 26.3% using the infrared drying method described above. Subsequent determination of molecular weight was made using the GPC method described above; the copolymer had a $M_w$ of 151,100 Da and $M_w/M_n$ of 1.85 based on two independent measurements. The product is a copolymer of EHMA and HEMA containing random side chains of TMI and is designated herein as EHMA/HEMA-TMI (97/3-4.7% w/w) and can be used to prepare a gel organosol in ISOPAR V.

Example 19

This is an example of a graft stabilizer which can be used to produce a gel organosol in a solvent having a solubility parameter higher than that of NORPAR 12 and which additionally contains a small quantity of more polar aromatic solvents. Using the method and apparatus of Example 1, 2560 g of EXXSOL D80, 849 g of EHMA, 27 g of 96% HEMA and 8.8 g of AIBN were combined in a reaction flask and the resulting mixture reacted at 70° C. for 16 hours. The mixture was then heated to 90° C. for 1 hour to destroy any residual AIBN, then was cooled back to 70° C. To the cooled mixture was then added 13.6 g of 95% DBTDL and 41.1 g of TMI. The TMI was added dropwise over the course of approximately five minutes while magnetically stirring the reaction mixture. Following the procedure of Example 1, the mixture was reacted at 70° C. for approximately 6 hours at which time the reaction was quantitative. The mixture was then cooled to room temperature. The cooled mixture was a viscous, transparent liquid.

The percent solids of the liquid mixture was determined to be 26.89% using the infrared drying method described above. Subsequent determination of molecular weight was made using the GPC method described above; the copolymer had a $M_w$ of 165,100 Da and $M_w/M_n$ of 1.84 based on two independent measurements. The product is a copolymer of EHMA and HEMA containing random side chains of TMI and is designated herein as EHMA/HEMA-TMI (97/3-4.7% w/w) and can be used to prepare a gel organosol in EXXSOL D80.

ORGANOSOL EXAMPLES

In the following examples of organosol preparation, it will be convenient to summarize the composition of each particular organosol in terms of the ratio of the total weight of monomers comprising the organosol core relative to the total weight of graft stabilizer comprising the organosol shell. This ratio is referred to as the core/shell ratio of the organosol. In addition, it will be useful to summarize the compositional details of each particular organosol by ratioing the weight percentages of monomers used to create the shell and the core. For example, an organosol designated ODA/ODMA/HEMA-TMI-MMA/EA (48.5/48.5/3-4.7//25/75% w/w) is made from shell comprised of a graft stabilizer precursor which is a copolymer consisting of 48.5 weight percent ODA, 48.5 weight percent ODMA and 3.0 percent HEM& to which is covalently bonded a grafting site consisting of 4.7 weight percent TMI based on the total weight of the graft stabilizer precursor. This graft stabilizer is covalently bonded to an organosol core which is comprised of 25 weight percent MMA and 75 weight percent EA.

Referring now to Table III, we have tabulated the compositions of organosols made using various graft stabilizers from the preceding examples. We have also tabulated values for the absolute difference in Hildebrand solubility parameter between the graft stabilizer precursor and the dispersant liquid for each of these examples. We have further noted which organosol compositions result in a non-gel (comparative examples) and a gel organosol. It will become clear in the examples which follow that we have discovered a method for producing gel organosols based upon the magnitude of this absolute difference in Hildebrand solubility parameter.

TABLE III

| Example Number | Organosol Composition (% w/w) | Dispersant Liquid | Hildebrand Solubility Parameter Difference ($|MPa^{1/2}|$) | Physical Form |
|---|---|---|---|---|
| 20 (Comparative) | LMA/HEMA-TMI//MMA/EA 97/3–4.7//25/75 | Norpar ™ | 2.54 | Opaque blue-white, non-gel |
| 21 | EHMA/HEMA-TMI//MMA/EA 97/3–4.7//25/75 (core shell ratio 4/1) | Norpar ™ | 2.67 | Opaque white, weak gel |
| 22 | EHMA/HEMA-TMI//MMA/EA 97/3–4.7//25/75 (core shell ratio 8/1) | Norpar ™ | 2.67 | Opaque white, weak gel |
| 23 (Comparative) | LA/HEMA-TMI//MMA/EA 97/3–4.7//25/75 | Norpar ™ | 2.65 | Opaque white, non-gel |
| 24 | HMA/HEMA-TMI//MMA/EA 97/3–4.7//25/75 | Norpar ™ | 2.83 | Opaque white, strong gel |
| 25 | HA/HEMA-TMI//MMA/EA 97/3–4.7//25/75 | Norpar ™ | 3.00 | Opaque white, very strong gel |
| 26 (Comparative) | ODA/ODMA/HEMA-TMI//MMA/EA 48.5/48.5/3—4.7//25/75 | Norpar ™ | 2.49 | Opaque yellow-white, non-gel |
| 27 (Comparative) | LMA/EHMA/HEMA TMI//MMA/EA 72.75/24.25/3–4.7//25/75 | Norpar ™ | 2.57 | Opaque yellow-white, non-gel (threshold) |
| 28 (Comparative) | LMA/EHMA/HEMA-TMI//MMA/EA 48.5/48.5/3–4.7//25/75 | Norpar ™ | 2.60 | Opaque white, non-gel (threshold) |
| 29 | LMA/EHMA/HEMA-TMI//MMA/EA 24.25/72.75/3–4.7//25/75 | Norpar ™ | 2.64 | Opaque white, weak gel (threshold) |
| 30 | ODMA/BA/HEMA-TMI//MMA/EA 72.75/24.25/3–4.7//25/75 | Norpar ™ | 2.63 | Opaque white, weak gel (threshold) |
| 31 | ODA/TBMA/HEMA-TMI//MMA/EA 24.25/72.75/3–4.7//25/75 | Norpar ™ | 2.77 | Opaque white, |
| 32 | LMA/HMA/HEMA-TMI//MMA/EA 24.25/72.75/3–4.7//25/75 | Norpar ™ | 2.76 | Opaque white, moderate gel |
| 33 | LA/EHMA/HEMA-TMI//MMA/EA 48.5/48.5/3–4.7//25/75 | Norpar ™ | 2.66 | Opaque white, weak gel |
| 34 | EHMA/HEMA- | Norpar ™ | 2.73 | Opaque white, |

TABLE III-continued

| Example Number | Organosol Composition (% w/w) | Dispersant Liquid | Hildebrand Solubility Parameter Difference ($MPa^{1/2}$) | Physical Form |
|---|---|---|---|---|
| | TMI/MMA/EA 97/3–4.7//25/75 | | | moderate gel |
| 35 | EHMA/HEMA-TMI/MMA/EA 97/3–4.7//25/75 | Isopar™ V | 2.55 | Opaque white, weak gel (threshold) |
| 36 | EHMA/HEMA-TMI/MMA/EA 97/3–4.7//25/75 | Exxsol™ D80 | 2.37 | Opaque white, weak gel |

Examples of Organosols Based on Copolymer Graft Stabilizers

Example 20 (Comparative)

This is a comparative example using the graft stabilizer in Example 1 to prepare a non-gel organosol. A 5000 mL 3-necked round bottom flask equipped with a condenser, a thermocouple connected to a digital temperature controller, a nitrogen inlet tube connected to a source of dry nitrogen and a magnetic stirrer, was charged with a mixture of 2981 g of NORPAR 12, 210 g of EA, 70 g of MMA, 233.3 g of the graft stabilizer mixture from Example 1 @ 30.0%, and 5.3 g of AIBN. While magnetically-stirring the mixture, the reaction flask was purged with dry nitrogen for 3 0 minutes at a flowrate of approximately 2 liters/minute. A hollow glass stopper was then inserted into the open end of the condenser and the nitrogen flowrate was reduced to approximately 0.5 liters/min. The mixture was heated to 70° C. with stirring, and the mixture was allowed to polymerize at 70° C. for 16 hours. The conversion was quantitative.

Approximately 700 g of n-heptane were added to the cooled organosol, and the resulting mixture was stripped of residual monomer using a rotary evaporator equipped with a dry ice/acetone condenser and operating at a temperature of 90° C. and a vacuum of approximately 15 mm Hg. The stripped organosol was cooled to room temperature, yielding an opaque blue-white dispersion which did not gel.

This non-gel organosol is designated LMA/HEMA-TMU/MMA/EA (97/3–4.7//25/75% w/w) and can be used to prepare non-gel ink formulations. The percent solids of this non-gel organosol dispersion was determined as 11.68% using the infrared drying method described above. Subsequent determination of average particle size was made using the dynamic light scattering method described above; the organosol had a z-average diameter of 94.6 nm.

Example 21

This example illustrates the use of the graft stabilizer in Example 3 to prepare a gel organosol with a core/shell ratio of 4/1. Using the method and apparatus of Example 20, 2851 g of NORPAR 12, 253 g of EA, 83 g of MMA, 306 g of the graft stabilizer mixture from Example 3 @ 27.42% polymer solids, and 6.3 g of AIBN were combined in a reaction flask. The resulting mixture was heated to 70° C. and reacted for 16 hours, at which time the resulting organosol was cooled to room temperature. After stripping the organosol using the method of Example 20 to remove residual monomer, the stripped organosol was cooled to room temperature, yielding an opaque white dispersion which formed a weak gel over the course of approximately 4 hours.

This gel organosol is designated EHMA/HEMA-TMF/MMA/EA (97/3–4.7//25/75% w/w) and can be used to prepare gel ink formulations. The percent solids of the gel organosol dispersion was determined as 12.8% using the infrared drying method described above. Subsequent determination of average particle size was made using the dynamic light scattering method described above; the organosol had a z-average diameter of 194.7 nm.

Example 22

This example illustrates a gel organosol that is useful for producing a more rapidly self-fixing color liquid color toner than Example 21 above. A gel organosol having a core/shell ratio of 8/1 is prepared by using the graft stabilizer of Example 3. Using the method and apparatus of Example 20, 2950 g of NORPAR 12, 281 g of EA, 93 g of MMA, 170 g of the graft stabilizer mixture from Example 3 @ 27.42% polymer solids, and 6.3 g of AIBN were combined in a reaction flask. The resulting mixture was heated to 70° C. and reacted for 16 hours, at which time the resulting organosol was cooled to room temperature. After stripping the organosol using the method of Example 20 to remove residual monomer, the stripped organosol was cooled to room temperature, yielding an opaque white dispersion which rapidly formed a weak gel over the course of approximately 2 hours.

This gel organosol is designated EHMA/HEMA-TMI//MMA/EA (97/3–4.7//25/75% w/w) and can be used to prepare gel ink formulations which rapidly self-fix. The percent solids of the gel organosol dispersion was determined as 12.70% using the infrared drying method described above. Subsequent determination of average particle size was made using the dynamic light scattering method described above; the organosol had a z-average diameter of 228.9 nm.

Example 23 (Comparative)

This is a comparative example using the graft stabilizer in Example 5 to prepare a non-gel organosol with a core/shell ratio of 4/1. In a one quart (0.946 liter), amber, narrow-mouthed glass bottle was charged 243.09 g of NORPAR 12, 21.60 g of EA, 7.20 g of MMA, 27.57 g of the graft stabilizer mixture from Example 5 @ 26.12%, and 0.54 g of AIBN. The bottle was purged for three minutes with dry nitrogen at a rate of approximately 1.5 liters/minute, then sealed with a screw cap fitted with a teflon liner. The cap was secured in place using electrical tape. The sealed bottle was then inserted into a metal cage assembly and installed on the agitator assembly of an Atlas Launder-Ometer. The Launder-Ometer was operated at its fixed agitation speed and a water bath temperature of 70° C. The mixture was allowed to react for approximately 16–18 hours, at which time the resulting organosol was cooled to room temperature.

Approximately 60 g of n-heptane were added to the cooled organosol, and the resulting mixture was stripped of residual monomer using a rotary evaporator equipped with a dry ice/acetone condenser and operating at a temperature of 90° C. and a vacuum of approximately 15 mm Hg. The stripped organosol was cooled to room temperature, yielding an opaque white dispersion which did not gel.

This non-gel organosol is designated LA/HEMA-TMI//MMAfEA (97/3-4.7//25/75% w/w) and can be used to prepare non-gel ink formulations. The percent solids of this non-gel organosol dispersion was determined as 14.10% using the infrared drying method described above. Subsequent determination of average particle size was made using the dynamic light scattering method described above; the organosol had a z-average diameter of 156.8 nm.

Example 24

This example illustrates the use of the graft stabilizer in Example 7 to prepare a gel organosol with a core/shell ratio of 4/1. Using the method and apparatus of Example 23, 243.18 g of NORPAR 12, 21.60 g of EA, 7.20 g of MMA, 28.25 g of the graft stabilizer mixture from Example 7 @ 26.20% polymer solids, and 0.54 g of AIBN were combined in a reaction flask. The resulting mixture was heated to 70° C. and reacted for 16–18 hours, at which time the resulting organosol was cooled to room temperature. After stripping the organosol using the method of Example 23 to remove residual monomer, the stripped organosol was cooled to room temperature, yielding an opaque white dispersion which rapidly formed a strong gel over the course of approximately 1 hour.

This gel organosol is designated HMA/HEMA-TMI//MMA/EA (97/3-4.7//25/75% w/w) and can be used to prepare gel ink formulations. The percent solids of the gel organosol dispersion was determined as 13.18% using the infrared drying method described above. Subsequent determination of average particle size was made using the dynamic light scattering method described above; the organosol had a z-average diameter of 205.8 nm.

Example 25

This example illustrates the use of the graft stabilizer in Example 8 to prepare a gel organosol with a core/shell ratio of 4/1. Using the method and apparatus of Example 23,242.41 g of NORPAR 12, 21.60 g of EA, 7.20 g of MMA, 28.50 g of the graft stabilizer mixture from Example 8 @ 25.49% polymer solids, and 0.54 g of AIBN were combined in a reaction flask. The resulting mixture was heated to 70° C. and reacted for 16–18 hours, at which time the resulting organosol was cooled to room temperature. After stripping the organosol using the method of Example 23 to remove residual monomer, the stripped organosol was cooled to room temperature, yielding an opaque white dispersion which slowly formed a very strong gel.

This gel organosol is designated HA/HEMA-TMI/MMA/EA (97/3-4.7//25/75% w/w) and can be used to prepare gel ink formulations. The percent solids of the gel organosol dispersion was determined as 12.08% using the infrared drying method described above. Subsequent determination of average particle size was made using the dynamic light scattering method described above; the organosol had a z-average diameter of 336.7 nm.

Examples of Organosols Based on Terpolymer Graft Stabilizers

Example 26 (Comparative)

This is a comparative example using the graft stabilizer in Example 9 to prepare a non-gel organosol with a core/shell ratio of 4/1. Using the method and apparatus of Example 20, 2898 g of NORPAR 12, 252 g of EA, 84 g of MMA, 260 g of the graft stabilizer mixture from Example 9 @ 32.31% polymer solids, and 6.3 g of AIBN were combined in a reaction flask. The resulting mixture was heated to 70° C. and reacted for 16 hours, at which time the resulting organosol was cooled to room temperature. After stripping the organosol using the method of Example 20 to remove residual monomer, the stripped organosol was cooled to room temperature, yielding an opaque yellow-white dispersion which did not form a gel.

This non-gel organosol is designated ODA/ODMA/HEMA-TMI//MMA/EA (48.5/48.5/3-4.7//25/75% w/w) and can be used to prepare non-gel ink formulations. The percent solids of this non-gel organosol dispersion was determined as 13.3% using the infrared drying method described above. Subsequent determination of average particle size was made using the dynamic light scattering method described above; the organosol had a z-average diameter of 130.1 nm.

EXAMPLE 27 (Comparative)

This is a comparative example of using the graft stabilizer in Example 10 to prepare a non-gel organosol with a core/shell ratio of 4/1. Using the method and apparatus of Example 23,243.49 g of NORPAR 12, 21.60 g of EA, 7.20 g of MMA, 27.17 g of the graft stabilizer mixture from Example 10 @ 26.5% polymer solids, and 0.54 g of AIBN were combined in a reaction flask. The resulting mixture was heated to 70° C. and reacted for 16–18 hours, at which time the resulting organosol was cooled to room temperature. After stripping the organosol using the method of Example 23 to remove residual monomer, the stripped organosol was cooled to room temperature, yielding an opaque yellow-white dispersion which did not form a gel.

This non-gel organosol is designated LMA/EHMA/HEMA-TMI//MMA/EA (72.75/24.25/3-4.7//25/75% w/w) and can be used to prepare non-gel ink formulations. The percent solids of the gel organosol dispersion was determined as 13.78% using the infrared drying method described above. Subsequent determination of average particle size was made using the dynamic light scattering method described above; the organosol had a z-average diameter of 129.5 nm.

Example 28 (Comparative)

This example illustrates the use of the graft stabilizer in Example 11 to prepare a non-gel organosol with a core/shell ratio of 4/1. Using the method and apparatus of Example 23,243.87 g of NORPAR 12, 21.60 g of EA, 7.20 g of MMA, 26.79 g of the graft stabilizer mixture from Example 11 @ 26.88% polymer solids, and 0.54 g of AIBN were combined in a reaction flask. The resulting mixture was heated to 70° C. and reacted for 16–18 hours, at which time the resulting organosol was cooled to room temperature. After stripping the organosol using the method of Example 23 to remove residual monomer, the stripped organosol was cooled to room temperature, yielding a viscous, opaque white dispersion which did not form a gel, but visually appeared to be on the threshold of forming a weak gel.

This non-gel organosol is designated LMA/EHMA/HEMA-TMI/MMA/EA (48.5/48.5/3-4.7//25/75% w/w) and can be used to prepare non-gel ink formulations. The percent solids of the non-gel organosol dispersion was determined as 14.29% using the infrared drying method described above. Subsequent determination of average particle size was made using the dynamic light scattering method described above; the organosol had a z-average diameter of 168.2 nm.

Example 29

This example illustrates the use of the graft stabilizer in Example 12 to prepare a gel organosol with a core/shell ratio of 4/1. Using the method and apparatus of Example 23, 243.49 g of NORPAR 12, 21.60 g of EA, 7.20 g of MMA, 27.17 g of the graft stabilizer mixture from Example 12 @ 26.50% polymer solids, and 0.54 g of AIBN were combined in a reaction flask. The resulting mixture was heated to 70° C. and reacted for 16–18 hours, at which time the resulting organosol was cooled to room temperature. After stripping the organosol using the method of Example 23 to remove residual monomer, the stripped organosol was cooled to room temperature, yielding an opaque white dispersion which formed a weak gel over the course of approximately 2 hours.

This gel organosol is designated LMA/EHMA/HEMA-TMI//MMA/EA (24.25/72.75/3-4.7//25/75% w/w) and can be used to prepare gel ink formulations. The percent solids of the gel organosol dispersion was determined as 15.02% using the infrared drying method described above. Subsequent determination of average particle size was made using the dynamic light scattering method described above; the organosol had a z-average diameter of 127.4 nm.

Example 30

This example illustrates the use of the graft stabilizer in Example 13 to prepare a gel organosol with a core/shell ratio of 4/1. Using the method and apparatus of Example 23, 248.01 g of NORPAR 12, 21.60 g of EA, 7.20 g of MMA, 22.65 g of the graft stabilizer mixture from Example 13 @ 31.79% polymer solids, and 0.54 g of AIBN were combined in a reaction flask. The resulting mixture was heated to 70° C. and reacted for 16–18 hours, at which time the resulting organosol was cooled to room temperature. After stripping the organosol using the method of Example 23 to remove residual monomer, the stripped organosol was cooled to room temperature, yielding an opaque white dispersion which slowly formed a weak gel with a cloudy supernatant liquid phase above the gel.

This gel organosol is designated ODMA/BA/HEMA-TMI//MMA/EA (72.75/24.25/3-4.7//25/75% w/w) and can be used to prepare gel ink formulations. The percent solids of the gel organosol dispersion was determined as 12.11% using the infrared drying method described above. Subsequent determination of average particle size was made using the dynamic light scattering method described above; the organosol had a z-average diameter of 170.1 nm.

Example 31

This example illustrates the use of the graft stabilizer in Example 14 to prepare a gel organosol with a core/shell ratio of 4/1. Using the method and apparatus of Example 23, 248.31 g of NORPAR 12, 21.60 g of EA, 7.20 g of MMA, 22.35 g of the graft stabilizer mixture from Example 14 @ 32.21% polymer solids, and 0.54 g of AIBN were combined in a reaction flask. The resulting mixture was heated to 70° C. and reacted for 16–18 hours, at which time the resulting organosol was cooled to room temperature. After stripping the organosol using the method of Example 23 to remove residual monomer, the stripped organosol was cooled to room temperature, yielding an opaque white dispersion which rapidly formed a strong gel over the course of approximately 1 hour, with a cloudy supernatant liquid phase above the gel.

This gel organosol is designated ODA/TBMA/HEMA-TMI//MMA/EA (24.25/72.75/3-4.7//25/75% w/w) and can be used to prepare gel ink formulations. The percent solids of the gel organosol dispersion was determined as 12.08% using the infrared drying method described above. Subsequent determination of average particle size was made using the dynamic light scattering method described above; the organosol had a z-average diameter of 181.9 nm

Example 32

This example illustrates the use of the graft stabilizer in Example 15 to prepare a gel organosol with a core/shell ratio of 4/1. Using the method and apparatus of Example 23, 247.66 g of NORPAR 12, 21.60 g of EA, 7.20 g of MMA, 23 g of the graft stabilizer mixture from Example 15 @ 31.30% polymer solids, and 0.54 g of AIBN were combined in a reaction flask. The resulting mixture was heated to 70° C. and reacted for 16–18 hours, at which time the resulting organosol was cooled to room temperature. After stripping the organosol using the method of Example 23 to remove residual monomer, the stripped organosol was cooled to room temperature, yielding an opaque white dispersion which formed a moderate gel over the course of approximately 4 hours.

This gel organosol is designated LMA/ttMA/HEMA-TMF/MMA/EA (24.25/72.75/3-4.7//25/75% w/w) and can be used to prepare gel ink formulations. The percent solids of the gel organosol dispersion was determined as 12.29% using the infrared drying method described above. Subsequent determination of average particle size was made using the dynamic light scattering method described above; the organosol had a z-average diameter of 182.5 nm.

Example 33

This example illustrates the use of the graft stabilizer in Example 16 to prepare a gel organosol. Using the method and apparatus of Example 23, 243.87 g of NORPAR 12, 21.60 g of EA, 7.20 g of MMA, 26.79 g of the graft stabilizer mixture from Example 16 @ 26.88% polymer solids, and 0.54 g of AIBN were combined in a reaction flask. The resulting mixture was heated to 70° C. and reacted for 16–18 hours, at which time the resulting organosol was cooled to room temperature. After stripping the organosol using the method of Example 23 to remove residual monomer, the stripped organosol was cooled to room temperature, yielding an opaque white dispersion which formed a weak gel over the course of approximately 4 hours.

This gel organosol is designated LA/EHMA/HEMA-TMI/MMA/EA (48.5/48.5/3-4.7//25/75% w/w) and can be used to prepare gel ink formulations. The percent solids or the gel organosol dispersion was determined as 12.89% using the infrared drying method described above. Subsequent determination of average particle size was made using the dynamic light scattering method described above; the organosol had a z-average diameter of 209.6 nm.

Examples of Gel Organosols formed in Alternative Solvent Systems

Example 34

This example illustrates the use of the graft stabilizer in Example 17 to prepare a gel organosol with a core/shell ratio of 4/1 in a solvent having a Hildebrand solubility parameter lower than that of NORPAR 12. Using the method and apparatus of Example 20, 2844 g of NORPAR 13,253 g of EA, 83 g of MMA, 313 g of the graft stabilizer mixture from Example 17 @ 26.8% polymer solids, and 6.3 g of AIBN were combined in a reaction flask. The resulting mixture was heated to 70° C. and reacted for 16 hours, at which time the resulting organosol was cooled to room temperature. After stripping the organosol using the method of Example 20 to remove residual monomer, the stripped organosol was cooled to room temperature, yielding an opaque white, fluid dispersion which rapidly formed a moderate gel over the course of approximately 2 hours.

This gel organosol is designated EHMA/HEMA-TMU/MMA/EA (97/3-4.7//25/75% w/w) and can be used to prepare gel ink formulations in NORPAR 13. The percent solids of the gel organosol dispersion was determined as 12.99% using the infrared drying method described above. Subsequent determination of average particle size was made using the dynamic light scattering method described above; the organosol had a z-average diameter of 200.9 nm.

Example 35

This example illustrates the use of the graft stabilizer in Example 18 to prepare a gel organosol with a core/shell ratio of 4/1 in a solvent having a Hildebrand solubility parameter higher than that of NORPAR 12. Using the method and apparatus of Example 20, 2838 g of ISOPAR V, 253 g of EA, 83 g of MMA, 319 g of the graft stabilizer mixture from Example 18 @ 26.3% polymer solids, and 6.3 g of AIBN were combined in a reaction flask. The resulting mixture was heated to 70° C. and reacted for 16 hours, at which time the resulting organosol was cooled to room temperature. After stripping the organosol using the method of Example 20 to remove residual monomer, the stripped organosol was cooled to room temperature, yielding an opaque white, fluid dispersion which rapidly formed a weak gel over the course of approximately 15 hours.

This gel organosol is designated EHMA/HEMA-TMU/MMA/EA (97/3-4.7//25/75% w/w) and can be used to prepare gel ink formulations ISOPAR V. The percent solids of the gel organosol dispersion was determined as 12.98% using the infrared drying method described above. Subsequent determination of average particle size was made using the dynamic light scattering method described above; the organosol had a z-average diameter of 184.7 nm.

Example 36

This example illustrates the use of the graft stabilizer in Example 19 to prepare a gel organosol in a solvent having a Hildebrand solubility parameter higher than that of NORPAR 12. Using the method and apparatus of Example 20, 2845 g of EXXSOL D80, 253 g of EA, 83 g of MMA 312 g of the graft stabilizer mixture from Example 19 @ 26.89% polymer solids, and 6.3 g of AIBN were combined and the resulting mixture heated to 70° C. and reacted for 16 hours, at which time the resulting organosol was cooled to room temperature. After stripping the organosol using the method of Example 20 to remove residual monomer, the stripped organosol was cooled to room temperature, yielding an opaque white, fluid dispersion which rapidly formed a weak gel over the course of approximately 2 hours.

This gel organosol is designated EHMA/HEMA-TMI//MMA/EA (97/3-4.7//25/75% w/w) and can be used to prepare gel ink formulations in EXXSOL D80. The percent solids of the gel organosol dispersion was determined as 11.79% using the infrared drying method described above. Subsequent determination of average particle size was made using the dynamic light scattering method described above; the organosol had a z-average diameter of 238.7 nm.

LIQUID TONER EXAMPLES

Example 37

This is an example of preparing a cyan liquid toner at an organosol pigment ratio of 6 using the gel organosol prepared at core/shell of 4 in Example 21. The organosol of example 21 was mixed using a Silverson mixer (Model L2R, Silverson Machines, Ltd., Waterside, England) operated at the lowest speed setting. After mixing for five minutes, 241 g of the homogenized organosol @ 12.8% (w/w) solids in NORPAR 12 were combined with 52 g of NORPAR 12, 5 g of Pigment Blue 15:3 (C.I 74160:3; #249–1282, Sun Chemical Company, Cincinnati, Ohio) and 2.09 g of 6.16% Zirconium HEX-CEM solution (OMG o Chemical Company, Cleveland, Ohio) in an eight ounce glass jar. This mixture was then milled in a 0.5 liter vertical bead mill (Model 6TSG-1/4, Aimex Co., Ltd., Tokyo, Japan) charged with 390 g of 1.3 mm diameter Potters glass beads (Potters Industries, Inc., Parsippany, N.J.). The mill was operated at 2,000 RPM for 1.5 hours without cooling water circulating through the cooling jacket of the milling chamber.

A portion of this 12% (w/w) solids toner concentrate was diluted to approximately 1.0% (w/w). This dilute toner sample exhibited the following properties as determined using the test methods described above:

Number Mean Particle Size: 0.46 micron

Bulk Conductivity: 25 picoMhos/cm

Percent Free Phase Conductivity: 5%

Dynamic Mobility: 0.0274 micron-cm/[Volt-second]

Zeta Potential: 55 mV

An additional portion of the 12% (w/w) solids toner concentrate was diluted to approximately 2.5% (w/w). This working strength toner was tested on the toner plating apparatus described previously. The reflection optical density (ROD) was greater than 1.3 at plating voltages greater than 450 volts; the charge/ROD of the 2.5% toner was 0.0536 micro-Coulombs/[$cm^2$-ROD].

Example 38

This is an example of preparing a yellow liquid toner at an organosol/pigment ratio of 5 using the gel organosol prepared at core/shell of 4 in Example 21. The organosol of example 21 was mixed using a Silverson mixer (Model L2R, Silverson Machines, Ltd., Waterside, England) operated at the lowest speed setting. After mixing for five minutes, 234 g of the homogenized organosol @ 12.8% (w/w) solids in NORPAR 12 were combined with 58 g of NORPAR 12, 6 g of Pigment Yellow 83 (C.I. 21108;#275-0570, Sun Chemical Company, Cincinnati, Ohio) and 1.46 g of 6.16% Zirconium HEX-CEM solution (OMG Chemical Company, Cleveland, Ohio) in an eight ounce glass jar. This mixture was then milled in a 0.5 liter vertical bead mill (Model 6TSG-1/4, Aimex Co., Ltd., Tokyo, lapan) charged with 390 g of 1.3 mm diameter Potters glass beads (Potters Industries, Inc., Parsippany, N.J.). The mill was operated at 2,000 RPM for 1.5 hours without cooling water circulating through the cooling jacket of the milling chamber.

A portion of this 12% (w/w) solids toner concentrate was diluted to approximately 1.0% (w/w). This dilute toner sample exhibited the following properties as determined using the test methods described above:

Number Mean Particle Size: 0.15 micron

Bulk Conductivity: 23 picoMhos/cm

Percent Free Phase Conductivity: 20%

Dynamic Mobility: 0.0468 micron-cm/[Volt-second]

Zeta Potential: 96 mV

An additional portion of the 12% (w/w) solids toner concentrate was diluted to approximately 2.5% (w/w). This working strength toner was tested on the toner plating apparatus described previously. The reflection optical density (ROD) was greater than 1.0 at plating voltages greater than 400 volts; the charge/ROD of the 2.5% toner was 0.0636 micro-Coulombs/[$cm^2$-ROD].

Example 39

This is an example of preparing a magenta liquid toner at an organosol/pigment ratio of 6 using the gel organosol prepared at core/shell of 4 in Example 21. The organosol of example 21 was mixed using a Silverson mixer (Model L2R, Silverson Machines, Ltd., Waterside, England) operated at the lowest speed setting. After mixing for five minutes, 241 g of the homogenized organosol @ 12.8% (w/w) solids in NORPAR 12 were combined with 54 g of NORPAR 12, 5 g of Pigment Red 81 (C.I. 45160; #221-0021, Sun Chemical Company, Cincinnati, Ohio) and 0.25 g of 6.16% Zirconium HEX-CEM solution (OMG Chemical Company, Cleveland, Ohio) in an eight ounce glass jar. This mixture was then milled in a 0.5 liter vertical bead mill (Model 6TSG-1/4, Aimex Co., Ltd., Tokyo, Japan) charged with 390 g of 1.3 mm diameter Potters glass beads (Potters Industries, Inc., Parsippany, N.J.). The mill was operated at 2,000 RPM for 1.5 hours without cooling water circulating through the cooling jacket of the milling chamber.

A portion of this 12% (w/w) solids toner concentrate was diluted to approximately 1.0% (w/w). This dilute toner sample exhibited the following properties as determined using the test methods described above:

Number Mean Particle Size: 0.44 micron

Bulk Conductivity: 37 picoMhos/cm

Percent Free Phase Conductivity: 15%

Dynamic Mobility: 0.0469 micron-cm/[Volt-second]

Zeta Potential: 96 mV

An additional portion of the 12% (w/w) solids toner concentrate was diluted to approximately 2.5% (w/w). This working strength toner was tested on the toner plating apparatus described previously. The reflection optical density (ROD) was greater than 1.3 at plating voltages greater than 500 volts; the charge/ROD of the 2.5% toner was 0.0386 micro-Coulombs/[$cm^2$-ROD].

Example 40

This is an example of preparing a preferred embodiment of black liquid toner at an organosol/pigment ratio of 6 using the gel organosol prepared at core/shell of 8 in Example 22. The organosol of example 22 was mixed using a Silverson mixer (Model L2R, Silverson Machines, Ltd., Waterside, England) operated at the lowest speed setting. After mixing for five minutes, 241 g of the homogenized organosol @ 12.7% (w/w) solids in NORPAR 12 were combined with 49 g of NORPAR 12, 5 g of Monarch 120 carbon black (Cabot Corp., Billerica, Mass.) and 3.34 g of 6.16% Zirconlure HEX-CEM solution (OMG Chemical Company, Cleveland, OI-1) in an eight ounce glass jar. This mixture was then milled in a 0.5 liter vertical bead mill (Model 6TSG-1/4, Aimex Co., Ltd., Tokyo, Japan) charged with 390 g of 1.3 mm diameter Potters glass beads (Potters Industries, Inc., Parsippany, N.J.). The mill was operated at 2,000 RPM for 1.5 hours without cooling water circulating through the cooling jacket of the milling chamber.

A portion of this 12% (w/w) solids toner concentrate was diluted to approximately 1.0% (w/w). This dilute toner sample exhibited the following properties as determined using the test methods described above:

Number Mean Particle Size: 0.28 micron

Bulk Conductivity: 47 picoMhos/cm

Percent Free Phase Conductivity: 2%

Dynamic Mobility: 0.0563 micron-cm/[Volt-second]

Zeta Potential: 116 mV

An additional portion of the 12% (w/w) solids toner concentrate was diluted to approximately 2.5% (w/w). This working strength toner was tested on the toner plating apparatus described previously. The reflection optical density (ROD) was greater than 1.3 at plating voltages greater than 400 volts; the charge/ROD of the 2.5% toner was 0.0600 micro-Coulombs/[$cm^2$-ROD].

Example 41

This example illustrates the preparation of a high solids gel organosol from a preformed lower solids gel organosol. Such high solids organosols can be used to prepare high solids toner concentrates suitable for use as toner replenishers in liquid immersion development. Approximately 2000 g of the gel organosol @ 12.8% solids from Example 21 was stored without agitation in a four liter wide mouth polyethylene bottle. After approximately 72 hours, the organosol had separated into a lower gel phase and a clear supernatant liquid phase consisting essentially of Norpar™ 12. The clear supernatant liquid was carefully decanted, and a sample of the lower gel phase was removed using a 50 mL beaker. The percent solids of this sample of concentrated gel organosol was determined using the infrared drying method described above. The gel organosol solids had increased from 12.8% to 41.6%. The resulting gel organosol concentrate can be used to prepare the preferred embodiment of gel inks at concentrations greater than 42% (w/w). Such ink concentrates have utility as replenishers for liquid immersion development from dilute toner dispersions.

Example 42

This example illustrates the preparation of a high solids gel ink from a preformed lower solids gel ink. This example also illustrates a method for additionally reducing the free phase conductivity of such gel ink concentrates relative to the starting ink. Such high solids inks with reduced free phase conductivity are particularly useful as toner replenishers in liquid immersion development. Approximately 35 g of the yellow gel ink @ 12% solids (20% free phase conductivity) from Example 38 was transferred to a 50 mL centrifuge tube and centrifuged at 5° C. for 5 minutes at 6,000 rpm (6, 110 relative centrifugal force) in a Jouan MR1822 centrifuge. The ink separated into a lower pigmented gel phase and a clear supernatant liquid phase consisting essentially of Norpar™ 12. The clear supernatant liquid was carefully decanted, a sample of the lower gel phase was removed. The percent solids of this sample of concentrated gel toner was determined using the infrared drying method described above. The gel toner solids had increased from 12.0% to 29.42%. Approximately 10 g of Norpar™ 12 was added to this gel toner concentrate. The gel concentrate was mixed by shaking the capped centrifuge tube. The concentrated gel ink readily redispersed upon mixing with the added Norpar™ 12. This sample was centrifuged at 5° C. for 1–2 hours at 6,000 rpm (6, 110 relative centrifugal force) in the Jouan MR1822 centrifuge. The supernatant liquid was then carefully decanted, and the conductivity of this liquid was measured using a Scientifica Model 627 conductance meter operating. The percentage of free phase conductivity relative to the bulk toner conductivity was now found to be approximately 10%, approximately half that of the original liquid toner. The resulting ink concentrate of reduced percent free phase conductivity is particularly suited for use as a high solids replenisher for liquid immersion development.

What is claimed:

1. A gel organosol dispersion comprising:

(a) an aliphatic hydrocarbon carrier liquid having a Kaufi-Butanol number less than 30; and (b) a (co)polymeric static stabilizer having a weight average molecular weight greater than or equal to 50,000 Daltons and a polydispersity less than 15, said steric stabilizer being covalently bonded to a thermoplastic (co)polymertc core that is insoluble in said carrier liquid, wherein the weight ratio of said (co)polymeric atetic stabilizer to said thermoplastic (co)polymeric core is between $\frac{1}{1}$ and $\frac{1}{15}$, and said (co)polymeric steric stabilizer comprises polymerizable organic compounds or mixture of polymerizable organic compounds having an absolute Hildebrand solubility parameter difference between said polymerizable organic compounds or said mixture of polymerizable organic compounds and said carrier liquid between 2.5 and 3.0 MPa$^{1/2}$.

2. The gel organosol dispersion of claim 1 wherein said thermoplastic (co)polymeric core has a glass transition temperature between 25° C. and −10° C.

3. The gel organosol dispersion of claim 1 further comprising at least one colorant.

4. The gel organosol dispersion of claim 1 wherein said absolute Hildebrand solubility parameter difference is between 2.6 and 3.0 MPa$^{1/2}$.

5. The gel organosol dispersion of claim 4 further comprising at least one colorant.

6. A gel organosol dispersion comprising:

(a) a carrier liquid having a Kauri-Butanol number less than 30; and (b) a (co)polymeric steric stabilizer having a weight average molecular weight greater than or equal to 50,000 Daltons and a polydispersity less than 15, said atetic stabilizer being covalently bonded to a thermoplastic (co)polymeric core that is insoluble in said carrier liquid, wherein the weight ratio of said (co)polymeric steric stabilizer to said thermoplastic (co)polymeric core is between $\frac{1}{1}$ and $\frac{1}{15}$, and said (co)polymeric steric stabilizer comprises polymerizable organic compounds or mixture of polymerizable organic compounds having an absolute Hildebrand solubility parameter difference between said polymerizable organic compounds or said mixture of polymerizable organic compounds and said carrier liquid between 2.5 and 3.0 MPa$^{1/2}$.

7. The gel organosol dispersion of claim 6 wherein the weight ratio of said (co)polymeric steric stabilizer to said thermoplastic (co)polymeric core is between ½ and $\frac{1}{10}$.

8. The gel organosol dispersion of claim 6 wherein the weight ratio of said (co)polymeric steric stabilizer to said thermoplastic (co)polymeric core is between ¼ and ⅛.

9. The gel organosol dispersion of claim 6 wherein said weight average molecular weight of said (co)polymeric steric stabilizer is between 50,000 and 750,000 Daltons.

10. The gel organosol dispersion of claim 6 wherein said thermoplastic (co)polymeric core comprises methyl methacrylate and ethyl acrylate.

11. The gel organosol dispersion of claim 10 wherein said thermoplastic (co)polymeric core comprises 25% by weight methyl methacrylate and 75% by weight ethyl acrylate.

12. The gel organosol dispersion of claim 6 wherein said (co)polymeric steric stabilizer is covalently bonded to said thermoplastic (co)polymeric core using a polyurethane linkage.

13. The gel organosol dispersion of claim 12 wherein said polyurethane linkage comprises a reaction product of a hydroxyl group incorporated into said steric stabilizer and an ethylenically unsaturated aliphatic isocyanate.

14. The gel organosol dispersion of claim 13 wherein said ethylenically unsaturated aliphatic isocyanate is meta-isopropenyldimethylbenzyl isocyanate.

15. The gel organosol dispersion of claim 6 wherein said polymerizable organic compounds or said mixture of polymerizable organic compounds are present in amounts of at least 80% by weight of the graft stabilizer polymer.

16. The gel organosol dispersion of claim 6 wherein said polymerizable organic compounds or said mixture of polymerizable organic compounds are present in amounts of at least 90% by weight of the graft stabilizer polymer.

17. The gel organosol dispersion of claim 6 wherein said polymerizable organic compounds or said mixture of polymerizable organic compounds are present in amounts of at least 92% by weight of the graft stabilizer polymer.

18. The gel organosol dispersion of claim 6 wherein said polymerizable organic compounds are selected from the group consisting of 2-ethylhexyl acrylate, lauryl acrylate, octadecyl acrylate, 2-ethylhexyl(methacrylate), hydroxy (ethylmethacrylate) and octadecyl(methacrylate).

19. A gel organosol dispersion comprising:

(a) a carrier liquid having a Kauri-Butanol number less than 30; and (b) a (co)polymeric steric stabilizer having a weight average molecular weight between 50,000 and 750,000 Daltons and a polydispersity less than 15, said steric stabilizer being covalently bonded to a thermoplastic (co)polymeric core that is insoluble in said carrier liquid, wherein the weight ratio of said (co) polymeric steric stabilizer to said thermoplastic (co) polymeric core is between $\frac{1}{1}$ and $\frac{1}{15}$, and said (co) polymeric steric stabilizer comprises polymerizable organic compounds or mixture of polymerizable organic compounds having an absolute Hildebrand solubility parameter difference between said polymerizable organic compounds or said mixture of polymerizable organic compounds and said carrier liquid between 2.5 and 3.0 MPa$^{1/2}$.

* * * * *

UNITED STATES PATENT AND TRADEMARK OFFICE
CERTIFICATE OF CORRECTION

PATENT NO.: 5,652,282

DATED: July 29, 1997

INVENTOR(S): Baker et al.

It is certified that errors appear in the above-identified patent and that said Letters Patent is hereby corrected as shown below:

Col. 15, line 23, "laurie" should be --lauric--.

Col. 17, line 51, "and o moderate" should be --and moderate--.

Col. 19, line 3, "carder" should be --carrier--.

Col. 20, line 32, "carder" should be --carrier--.

Col. 20, line 56, "cl Liquid Toner Properties" should start a new paragraph with --Liquid Toner Properties:--

Col. 23, TABLE II, at approximately line 20, Example Number Comparative 6, Norpar™ should be --Norpar™ 12--.

Col. 23, TABLE II, at approximately line 34, Example Number 12, in the Hildebrand Solubility Parameter Difference (IMPa½I) column, "2.60" should be --2.64--.

Col. 23, line 52, "ofmonomers" should be --of monomers--.

Col. 24, line 59, "polymefize" should be --polymerize--.

UNITED STATES PATENT AND TRADEMARK OFFICE
CERTIFICATE OF CORRECTION

PATENT NO.: 5,652,282
DATED: July 29, 1997
INVENTOR(S): Baker et al.

It is certified that errors appear in the above-identified patent and that said Letters Patent is hereby corrected as shown below:

Col. 25, line 35, "polymefize" should be --polymerize--.

Col. 26, line 35, "for I hour" should be --for 1 hour--.

Col. 35, line 31, "for 3 0 minutes" should be --for 30 minutes--.

Col. 37, line 5, "60 g ofn-heptane" should be --60 g of n-heptane--.

Col. 42, line 19, "(OMG o Chemical" should be --(OMG Chemical--.

Col. 45, line 16, "Kaufi-" should be --Kauri--.

Col. 45, line 18, "static" should be --steric--.

Col. 45, line 22, "(co)polymertc" should be --(co)polymeric--.

Col. 45, line 24, "atetic" should be --steric--.

Col. 45, line 50, "atetic" should be --steric--.

Signed and Sealed this

Twenty-fourth Day of October, 2000

Attest:

Q. TODD DICKINSON

*Attesting Officer*         *Director of Patents and Trademarks*